United States Patent [19]
Flynn et al.

[11] Patent Number: 5,513,494
[45] Date of Patent: May 7, 1996

[54] OCEAN THERMAL ENERGY CONVERSION (OTEC) SYSTEM

[75] Inventors: Robert J. Flynn; George J. Cicchetti, both of Great Falls, Va.; Jonathan d'E Coony, Washington, D.C.; Lloyd A. Bush, East Hampton, N.Y.

[73] Assignee: OTEC Developments, Silver Spring, Md.

[21] Appl. No.: 298,664

[22] Filed: Aug. 31, 1994

Related U.S. Application Data

[63] Continuation-in-part of Ser. No. 280,923, Jul. 26, 1994, which is a continuation-in-part of Ser. No. 228,397, Jul. 15, 1994, which is a continuation-in-part of Ser. No. 166,005, Dec. 14, 1993.

[51] Int. Cl.$^6$ .................................................. F03G 7/05
[52] U.S. Cl. .................. 60/641.7; 60/648; 60/652; 48/77
[58] Field of Search ......................... 60/641.6, 641.7, 60/648, 652; 48/201, 77

[56] References Cited

U.S. PATENT DOCUMENTS

| | | | |
|---|---|---|---|
| 1,952,520 | 3/1934 | Urquhart | 60/641.7 |
| 2,006,985 | 7/1935 | Claude et al. | 122/40 |
| 3,459,953 | 8/1969 | Hughes et al. | 60/653 |
| 3,628,332 | 12/1971 | Kelmar | 60/652 |
| 3,928,145 | 12/1975 | Othmer | 203/11 |
| 3,967,449 | 7/1976 | Beck | 60/641 |
| 4,038,189 | 7/1977 | Fetkovich . | |
| 4,046,639 | 9/1977 | Carson . | |
| 4,046,640 | 9/1977 | Carson | 203/11 |
| 4,055,145 | 10/1977 | Mager et al. | 119/212 |
| 4,072,579 | 2/1978 | Carson | 203/11 |
| 4,091,623 | 5/1978 | Edmondson et al. . | |
| 4,094,747 | 6/1978 | Pfenninger . | |
| 4,104,883 | 8/1978 | Naef | 60/641.7 |
| 4,110,174 | 8/1978 | Carson | 203/11 |
| 4,121,977 | 10/1978 | Carson | 251/11 |
| 4,132,075 | 1/1979 | Fleck et al. . | |
| 4,138,851 | 2/1979 | Rogers et al. . | |
| 4,152,898 | 5/1979 | Awerbuch . | |
| 4,189,647 | 2/1980 | Wittig | 290/42 |
| 4,189,924 | 2/1980 | LaCoste | 60/641.7 |
| 4,189,925 | 2/1980 | Long | 60/652 |
| 4,210,819 | 7/1980 | Wittig et al. | 60/641.7 |
| 4,210,820 | 7/1980 | Wittig | 290/52 |
| 4,216,657 | 8/1980 | Ridgway | 60/641.7 |
| 4,302,297 | 11/1981 | Humiston . | |
| 4,302,682 | 11/1981 | LaCoste . | |
| 4,370,859 | 2/1983 | Assaf | 60/641.6 |
| 4,430,861 | 2/1984 | Avery | 60/675 |
| 4,441,321 | 4/1984 | Ridgway | 60/641.7 |
| 4,475,342 | 10/1984 | Assaf | 60/641.6 |
| 4,537,030 | 8/1985 | Berman | 60/641.7 |
| 4,628,212 | 12/1986 | Uehara et al. | 290/54 |
| 4,726,191 | 2/1988 | Kawamura | 60/641.7 |
| 4,907,410 | 3/1990 | Chang . | |
| 5,096,543 | 3/1992 | Elmore . | |
| 5,207,875 | 5/1993 | Zapka et al. | 203/11 |

OTHER PUBLICATIONS

"Ocean Technologies and Opportunities in the Pacific for the 90's" Oceans Oct. 1–3, 1991 Honolulu, Hawaii USA vol. 1 IEEE.

"Production of Desalinated Water Using Ocean Thermal Energy" T. Rabas, et al IEEE 1991.

*Primary Examiner*—Denise L. Gromada
*Assistant Examiner*—L. Heyman

[57] ABSTRACT

A hybrid ocean thermal energy conversion (OTEC) system, including an energy generation sub-system for receiving warm sea water, evaporating a working fluid at a natural depth of the received warm sea water to produce a working vapor, and generating energy from the working vapor and a pumping sub-system for pushing cold sea water up to a natural depth of the received warm sea water and condensing the working vapor with the cold sea water.

4 Claims, 32 Drawing Sheets

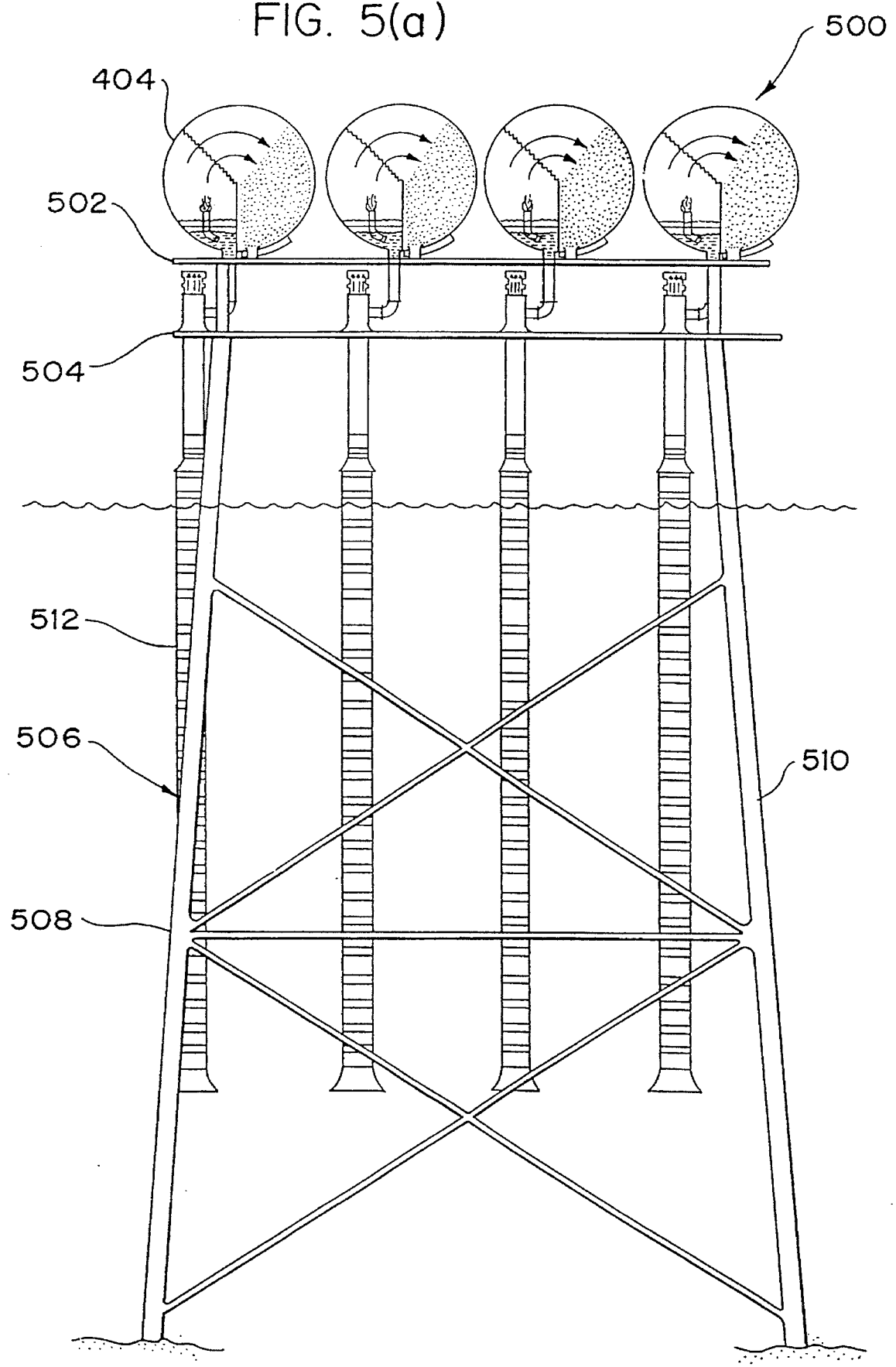

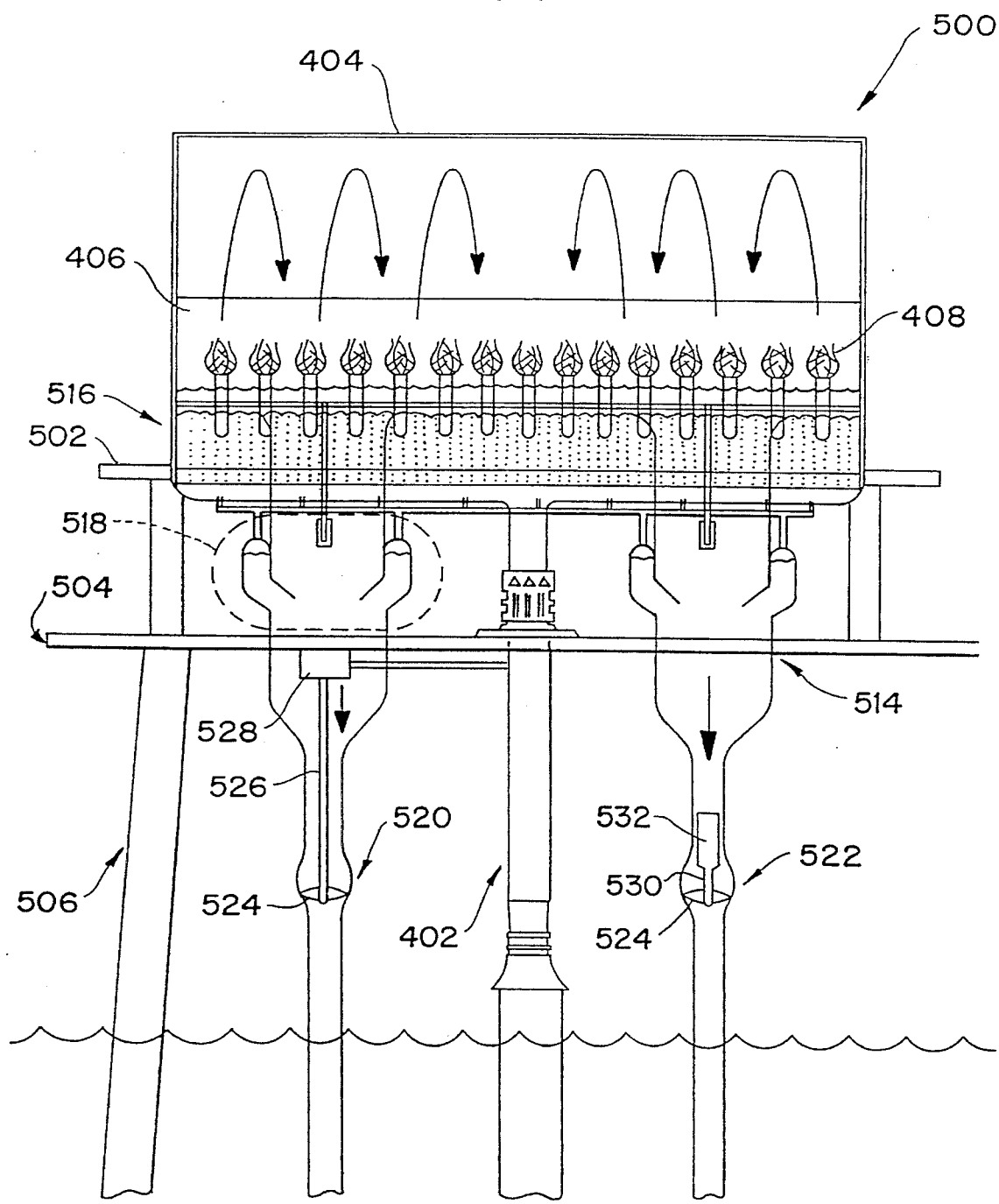

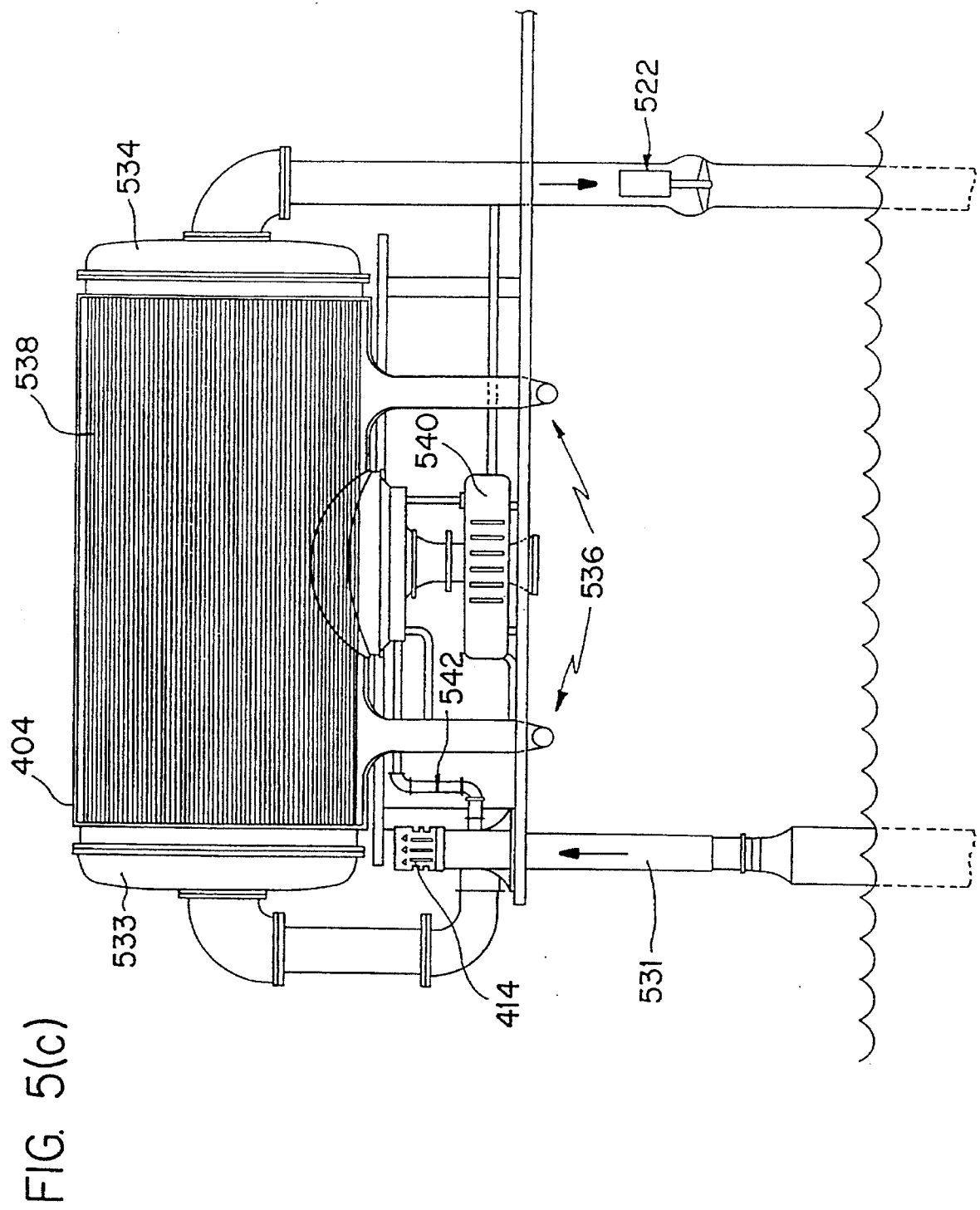

OCEAN THERMAL ENERGY CONVERSION (OTEC) SYSTEM

This application is a continuation-in-part of application Ser. No.: 08/280,923 filed on Jul. 26, 1994 which is a continuation-in-part of application Ser. No.: 08/228,397 filed on Apr. 15, 1994, which is a continuation-in-part of application Ser. No. 08/166,005 filed on Dec. 14, 1993, the entire contents of all of which are hereby incorporated by reference.

The present invention relates to an improved ocean thermal energy conversion (OTEC) system.

BACKGROUND OF THE INVENTION

Conventional ocean thermal energy conversion (OTEC) systems generally fall into three categories; first, a closed-cycle OTEC system 100 for generating electricity as illustrated in FIG. 1; second, an open-cycle OTEC system 200 for generating electricity as a primary product and fresh water as a secondary product as illustrated in FIG. 2; and third, a hybrid-cycle OTEC system 300 for generating electricity as a primary product and desalinated water as a secondary product, illustrated in FIG. 3. Each of these conventional OTEC systems will be discussed below in detail.

As illustrated in FIG. 1, a working fluid, which is contained within the closed cycle, is pumped by a liquid pump 102 into evaporator 104, where heat from a warm water intake is transferred from the warm water to the working fluid to generate a working fluid vapor. The warm water exiting the evaporator 104 is discharged to the sea. The working fluid vapor enters a turbogenerator 106 in order to generate electricity by conventional techniques. The working fluid vapor exits the turbogenerator 106 and is condensed in condenser 108 utilizing cold sea water as a heat sink. The condensed working fluid is then fed back to the feed pump in order to complete the closed cycle.

The open-cycle OTEC system 200 illustrated in FIG. 2 includes a flash evaporator 202 for receiving a warm sea water intake and outputting steam. Further, a pump 204 pumps a warm sea water discharge out of the flash evaporator 202. The steam output from the flash evaporator 202 is input to turbine 206 which is connected to generator 208 in order to generate electricity by conventional techniques. Steam exits the turbine 206 and is input to condenser 210. The conventional open-cycle OTEC system 200 utilizes a surface condenser and a direct contact condenser. A surface condenser keeps the two fluids (sea water and pure water) separate while a direct contact condenser does not. A majority of the steam exiting the turbine 206 is provided to a direct contact condenser in the conventional open-cycle OTEC system 200, in order to generate electricity. The conventional open-cycle OTEC system 200 utilizes a surface condenser to condense a small percentage of the steam generated by the turbine 206 into fresh water utilizing cold sea water as a heat sink. A cold sea water discharge is pumped out of the condenser 210 by a pump 212. The non-condensible exhaust system 212, removes non-condensible gases and a portion of the steam from the steam output from the turbine 206. In the open- cycle OTEC system 200 described above, the generation of electricity by the turbine 206 and generator 208 is the primary product and the fresh desalinated water output from the condenser 210 is the secondary product.

The hybrid-cycle OTEC system 300 illustrated in FIG. 3 includes an evaporator system 302 into which warm sea water is input, of which a small fraction, vaporizes in a vacuum flash evaporator 304. The vapor condenses on an ammonia evaporator 306, which contains ammonia liquid, pumped from pump 308. The vapor from the flash evaporation system 302 condenses on the ammonia evaporator 306, producing desalinated water. The ammonia vapor is input to an ammonia turbine/generator 310 in order to generate electricity by conventional techniques. The ammonia vapor is then condensed in an ammonia condenser 312. The recondensed ammonia is recycled to the pump 308 to complete the closed portion of the hybrid-cycle OTEC system 300.

Both the closed cycle and open cycle OTEC systems discussed above utilize separate evaporators and condensers. Further the hybrid cycle OTEC system discussed above utilizes a conventional evaporator system 302. The improved OTEC system of the present application includes a novel combined evaporator/condenser in contrast to the three above-identified systems. The combined evaporator/condenser further includes a plurality of evaporator spouts and a mist eliminator. The OTEC system of the present application further maintains a constant low pressure over each of the plurality of evaporator spouts. The OTEC system of the present application also generates fresh water as a primary product. The OTEC system of the present application generates only enough electricity, as a secondary product, to operate the OTEC system itself.

SUMMARY OF THE INVENTION

One object of the present invention is to provide an improved ocean thermal energy conversion (OTEC) system.

It is a further object of the present invention to provide a hybrid ocean thermal energy conversion (OTEC) system which receives, warm sea water, evaporates a working fluid at a natural depth of the received warm sea water to produce a working vapor, generates energy from the working vapor, pushes cold sea water up to a natural depth of the received warm sea water, and condenses the working vapor with the cold sea water.

It is a further object of the present invention to provide a hybrid OTEC system which receives warm sea water, evaporates a working fluid with the received warm sea water to produce a working vapor, generates energy from the working vapor, hydrolizes a source of water into hydrogen gas and oxygen gas receives the hydrogen gas and for producing electricity, and receives the oxygen gas and for gasifying coal to produce methane.

These objects of the present invention are fulfilled by providing a hybrid ocean thermal energy conversion (OTEC) system comprising energy generation means for receiving warm sea water, evaporating a working fluid at a natural depth of the received warm sea water to produce a working vapor, and generating energy from the working vapor; and pumping means for pushing cold sea water up to a natural depth of the received warm sea water and condensing the working vapor with the cold sea water.

These objects of the present invention are further fulfilled by providing a hybrid OTEC system comprising energy generation means for receiving warm sea water, evaporating a working fluid with the received warm sea water to produce a working vapor, and generating energy from the working vapor;

water hydrolysis means, driven by the energy generated by said energy generation means, for hydrolyzing a source of water into hydrogen gas and oxygen gas;

hydrogen combustion means for receiving the hydrogen gas and for producing electricity; and coal gasification means for receiving the oxygen gas and for gasifying coal to produce methane.

These and other objects of the present invention will become more readily apparent from the detailed description given hereafter. However, it should be understood that a detailed description and specific Examples, while indicating preferred embodiments of the invention, are given by way of illustration only, since various changes and modifications within the spirit and scope of the invention will become apparent to those skilled in the art from this description.

BRIEF DESCRIPTION OF THE DRAWINGS

The present invention will become more fully understood from the detailed description given hereinbelow and the accompanying drawings which are given by way of illustration only and thus are not limitative of the present, invention and wherein:

FIG. 5(a) illustrates the platform which supports the improved OTEC system illustrated in FIGS. 4(a) and 4(b);

FIG. 5(b) illustrates the platform and the evaporator/condenser from an evaporator perspective;

FIG. 5(c) illustrates the platform and the evaporator/condenser from a condenser perspective;

DETAILED DESCRIPTION OF THE PREFERRED EMBODIMENT

Figure 1:
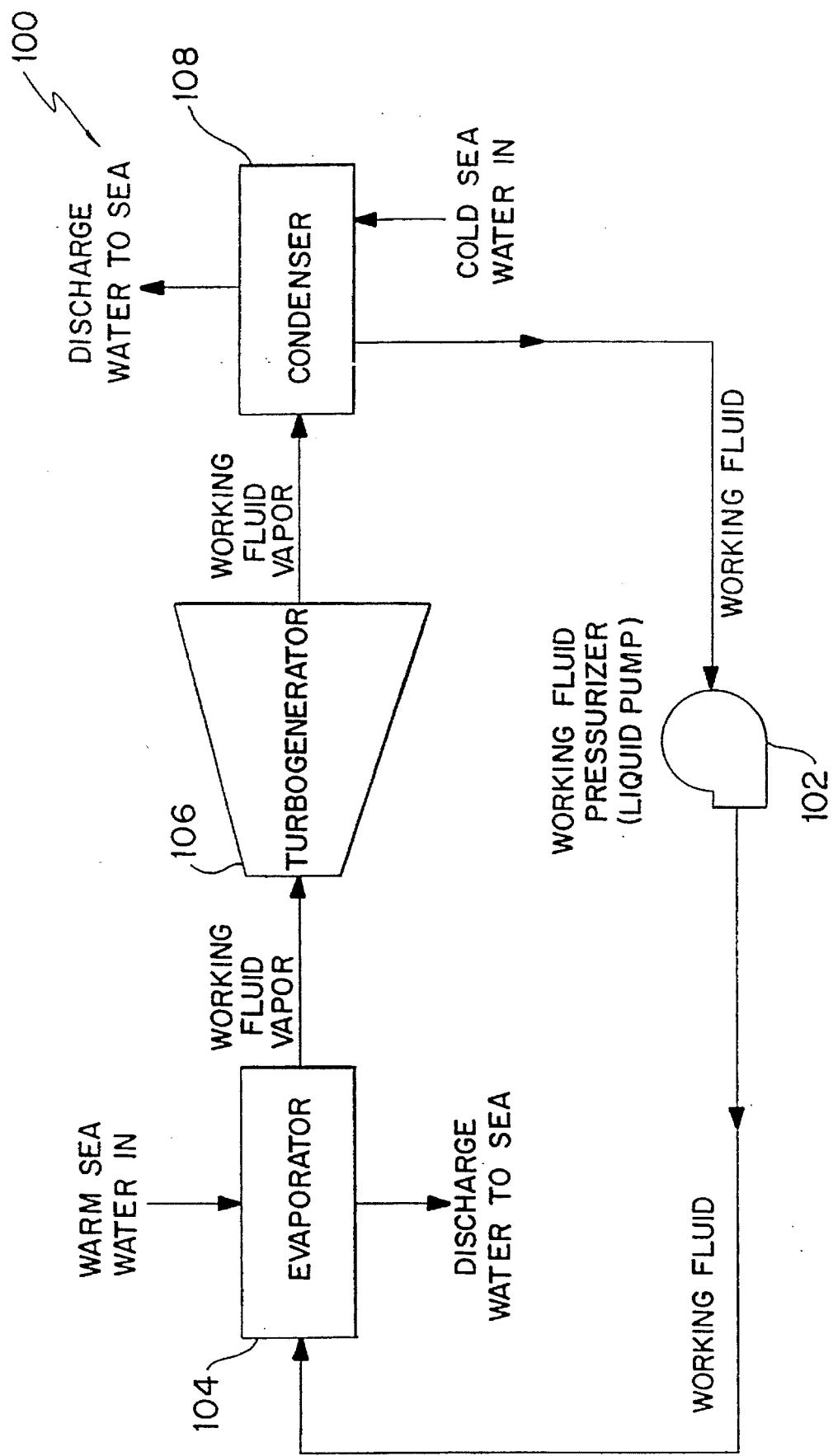
FIG. 1 illustrates a conventional closed-cycle OTEC system.
Figure 2:
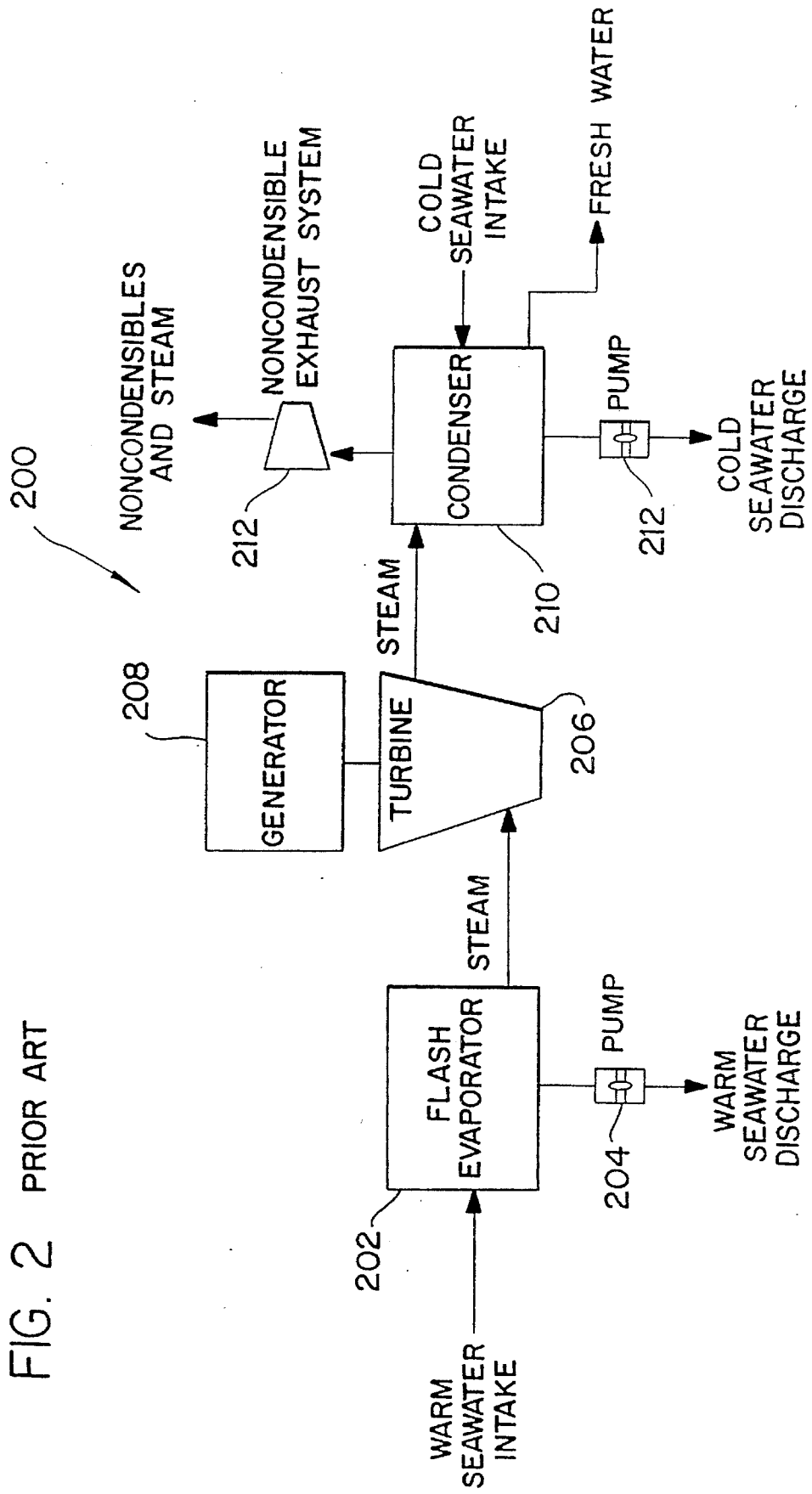
FIG. 2 illustrates a conventional open-cycle OTEC system.
Figure 3:
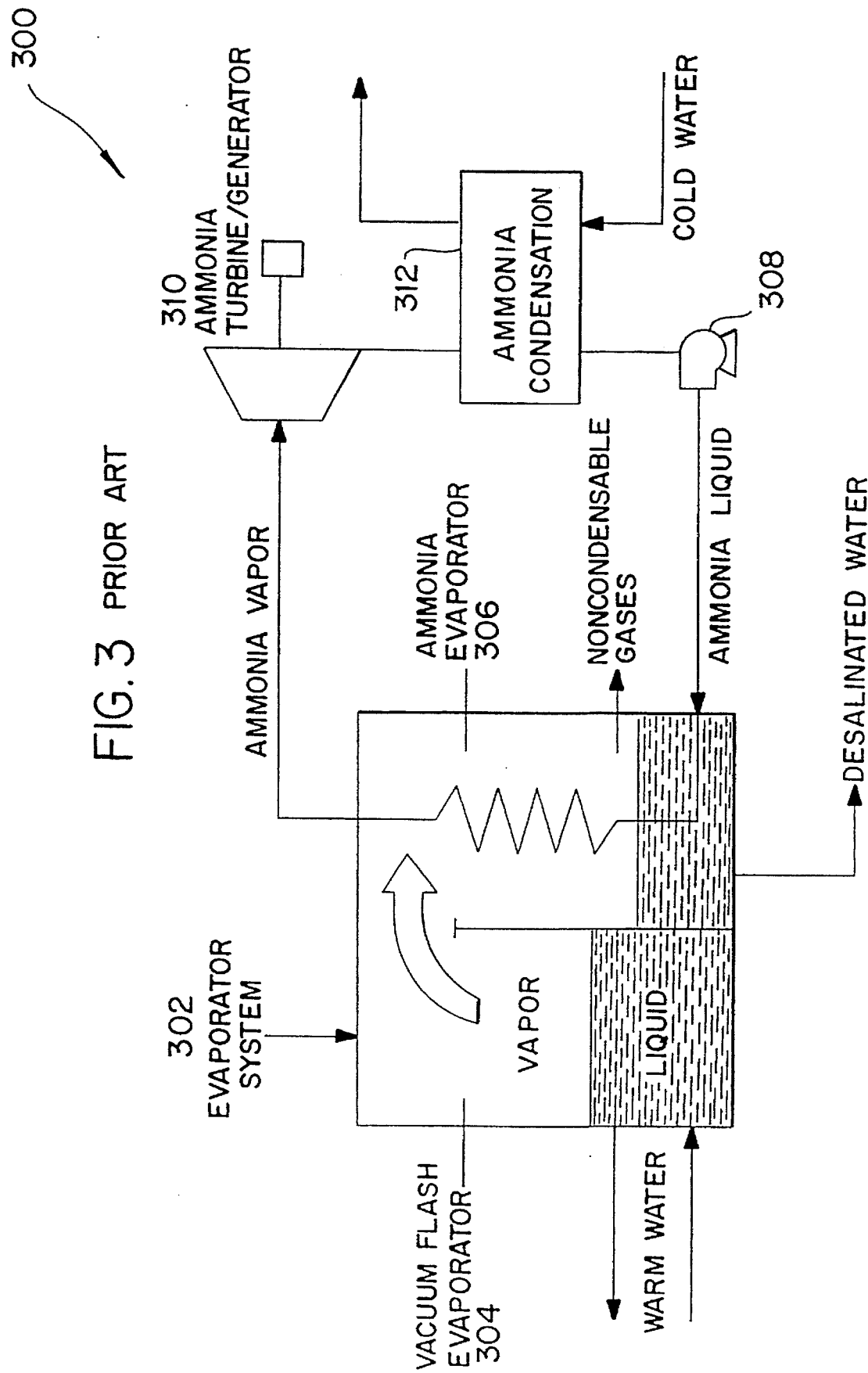
FIG. 3 illustrates a conventional hybrid-cycle OTEC system.
Figure 4A:
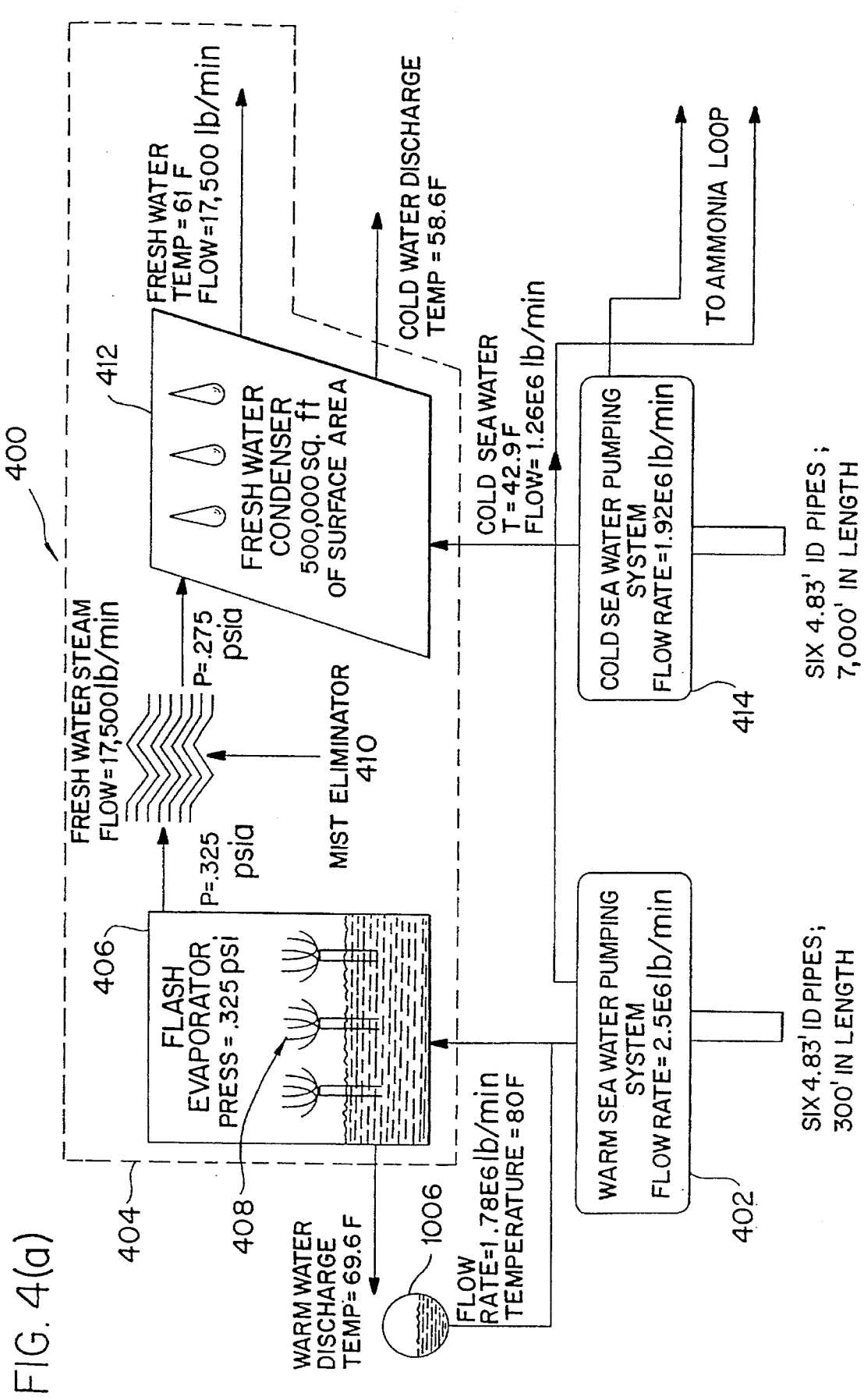
FIGS. 4(a) and 4(b) illustrate the improved OTEC system of the present invention, in a preferred embodiment.
Figure 4B:
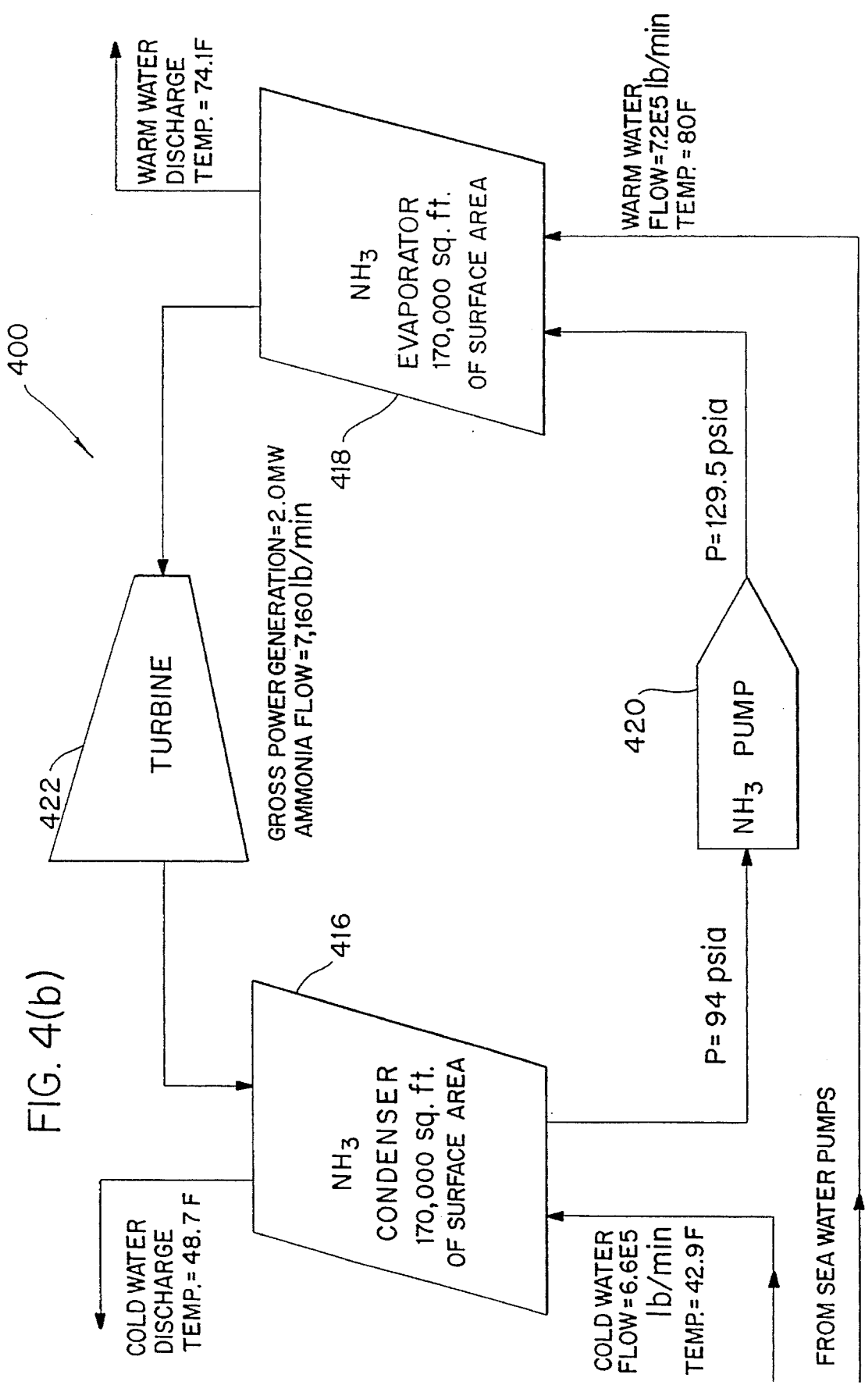

The improved ocean thermal energy conversion (OTEC) system 400 of the present invention, in a preferred embodiment, is illustrated in FIGS. 4(a) and 4(b). This OTEC system 400 generates three million gallons of water per day and 2.0 megawatts of gross electricity. These 2.0 megawatts of electricity are utilized to power the OTEC system 400 illustrated in FIGS. 4(a) and 4(b), and as a result, the net electricity generated by the OTEC system 400 of the present application is zero megawatts. The various components of the OTEC system of the present application are sized such that the number of gallons of fresh water is maximized and the amount of electricity generated is sufficient enough to power the OTEC system 400.

As illustrated in FIGS. 4(a) and 4(b), the OTEC system 400 of the present application comprises warm sea water pumping system 402 for pumping 2,500,000 pounds of warm sea water per minute. The warm sea water pumping system 402 is fed by six 4.83 foot ID pipes, which are each 300 feet in length. The 80° F. warm sea water exiting the warm sea water pumping system 402 is split. 1,780,000 pounds per minute flows to flash evaporator 406 and 720,000 pounds per minute flows to ammonia evaporator 412. The warm sea water enters evaporator/condenser 404 at flash evaporator 406 which is maintained at a pressure of 0.325 psi. The warm sea water is flash evaporated through several flash evaporator spouts 408. A warm water discharge at a temperature of 69.6° F. and steam at a pressure of less than or equal to 0.325 psi exit the flash evaporator 406. The steam is input to a mist eliminator 410 at a rate of 17,500 pounds per minute and the steam exiting from the mist eliminator 410 exits at a pressure of greater than or equal to 0.275 psia. This steam is input to a fresh water condenser 412 having 500,000 sq. ft. of surface area.

Entering tubes of the fresh water condenser 412 is cold sea water at a rate of 1,260,000 pounds per minute at a temperature of 42.9° F. This cold sea water is provided by cold sea water pumping system 414 which receives 1,920,000 pounds of cold sea water per minute via six 4.83 foot ID pipes, each of which are 7,000 feet in length. The fresh water condenser 412 generates fresh desalinated water at a rate of 17,500 pounds per minute at a temperature of 61° F. and a cold sea water discharge flow at a temperature of 58.6° F. The fresh water exiting the fresh water condenser 412 is the primary product of the improved OTEC system 400 of the present application.

As discussed above, FIG. 4(a) illustrates each of the elements necessary to generate fresh desalinated water from the OTEC system 400 of the present application. In contrast, FIG. 4(b) of the present application illustrates the components necessary to generate sufficient electricity to power the OTEC system 400.

The warm sea water pumping system takes in 2,500,000 pounds of warm sea water per minute and outputs 1,780,000 pounds of warm sea water per minute to the flash evaporator 406. The remaining 720,000 pounds of warm sea water per minute at a temperature of 80° F. is input to an ammonia evaporator 418.

Similarly, the cold sea water pumping system 414 receives cold sea water at a rate of 1,920,000 pounds per minute and outputs 1,260,000 pounds of cold sea water per minute to the fresh water condenser 412.

The remaining 660,000 pounds of cold sea water at a temperature of 42.9° F. is input to an ammonia condenser 416. The warm sea water from the warm sea water pumping system 402 is input to the ammonia evaporator 418, which has 170,000 sq. ft. of surface area.

The warm sea water heats liquid ammonia pumped by an ammonia pump 420 at a pressure of 129.5 psia to produce ammonia vapor and a warm water discharge at a temperature of 74.1° C. The ammonia vapor is input to a turbine 422 at a rate of 7,160 pounds of ammonia vapor per minute in order to produce a gross power generation of 2.0 megawatts. The ammonia vapor exiting the turbine 422 is input to the ammonia condenser 416, which also has 170,000 sq. ft. of surface area.

The cold sea water from the cold sea water pumping system 414 is also input to the ammonia condenser 416, which outputs a cold water discharge at a temperature of 48.7° F. and liquid ammonia at a pressure of 94 psia. This ammonia is recycled back to the ammonia pump 420 in order to complete the closed cycle ammonia path.

The OTEC system 400 described in FIGS. 4(a) and 4(b) is supported by the platform 500, illustrated in FIG. 5(a). The platform 500 includes two decks 502 and 504, and further includes a jacket 506 which includes all of the structure below the deck 504. The jacket 506 extends approximately 30 feet above the water surface. The jacket 506 has six legs, two of which are shown in FIG. 5(a) as legs 508 and 510. The legs, which may house the 4.83 foot ID pipes, which provide the cold sea water pumping system 414 with cold sea water from a depth of 2700 feet. FIG. 5(a) further illustrates four evaporator/condensers 400, although this number may vary depending on the desired amount of fresh water. Warm sea water intake pipes 512 extend down less than 100 feet and feed the four evaporator/condensers 404.

FIG. 5(b) illustrates the platform 500, the warm sea water pumping system 402, an evaporator/condenser 404 (from an evaporator perspective), a warm sea water discharge system 514, and a non-condensible removal system 516. As illustrated in FIG. 5(b), each flash evaporator 406 includes fifteen flash evaporator spouts 408.

FIG. 5(b) further illustrates a seed bubble generation system 518. FIG. 5(b) further illustrates two alternative energy recovery turbines 520 and 522, each of which include a turbine blade system 524 for the extraction of power from the discharged warm sea water. In the energy recovery turbine 520, the warm water discharge turns a turbine shaft 526 and the shaft 526 turns a right angle gear box 528, which is connected to a pump of the warm sea water pumping system 402, thereby providing auxiliary power to the pump. In the energy recovery turbine 522, the warm water discharge turns a turbine shaft 530, which is connected to a generator 532. The electricity produced by the generator 532 is used as needed anywhere in the OTEC system 400 to reduce the energy consumption.

FIG. 5(c) illustrates the evaporator/condenser 404 from a condenser perspective and the cold sea water pumping system 414. The cold sea water enters a pump 531 of the cold sea water pumping system 414. The cold sea water is then pumped to an inlet manifold 533 which distributes the cold sea water through a plurality of condenser tubes 538 of the fresh water condenser 412. The cold sea water exits the fresh water condenser 412 through an exit manifold 534 and a cold sea water discharge pipe. An energy recovery turbine 522 is located in the cold water discharge and performs the same function as the energy recovery turbine 522 of FIG. 5(b). Steam condenses on an exterior of the plurality of condenser tubes 538. The condensed steam is routed into funnel-shaped collection ports 536, which is then pumped to shore. Non-condensible gases and a portion of uncondensed steam are input to vacuum system 540, which compresses the mixture to condense the previously uncondensed steam and expel the non-condensible gases to the atmosphere or to the warm or cold water discharges. A portion of the cold sea water is input to the vacuum system 540 via pipe 542 to help cool this process.

Figure 6A:
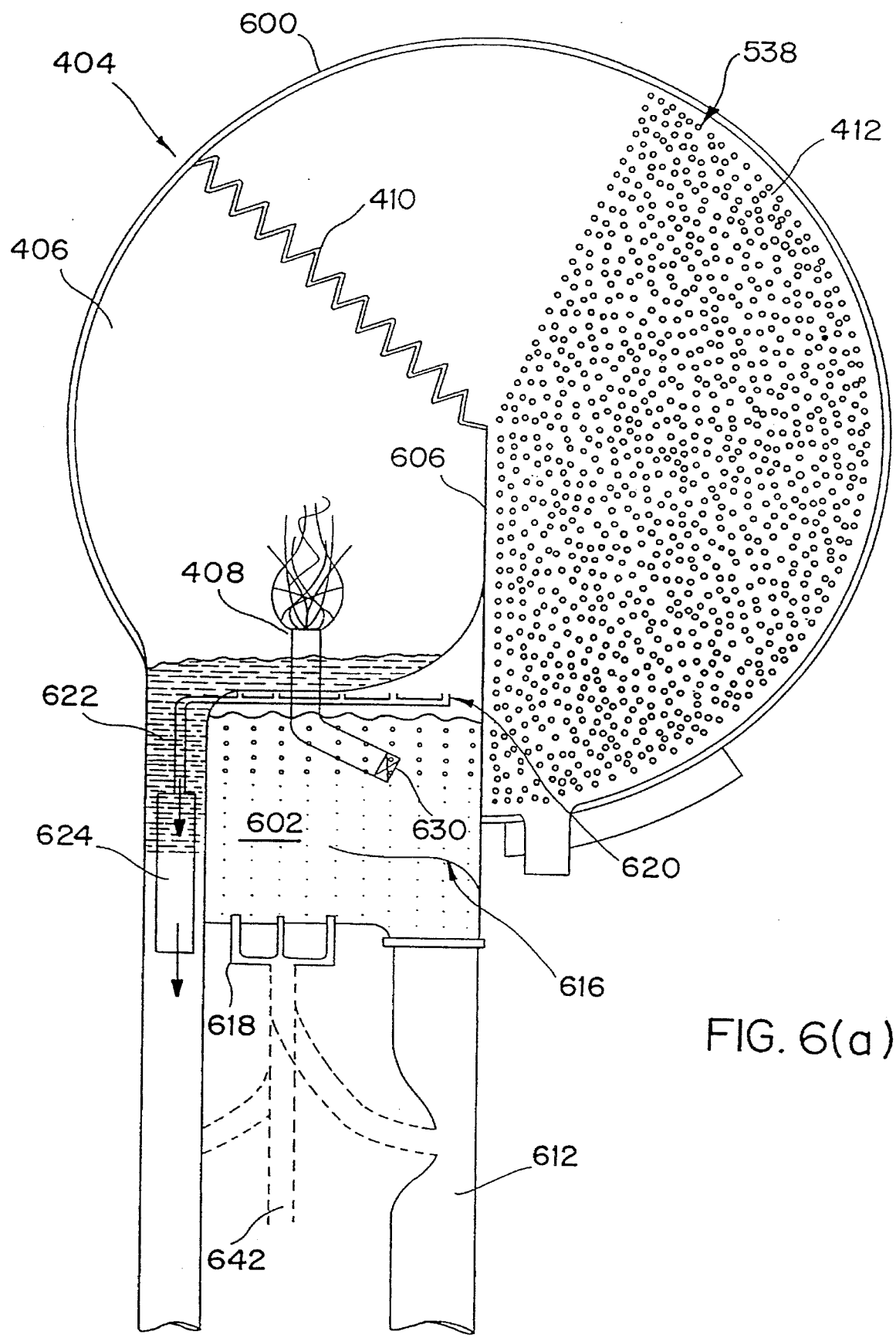
FIGS. 6(a) illustrates one embodiment of the novel combined evaporator/condenser for the OTEC system illustrated in FIGS. 4(a) and 4(b)

The evaporator/condenser 404, illustrated in FIG. 4(a), will now be described in further detail, as illustrated in FIGS. 6(a). The flash evaporator 406, the mist eliminator 410, the fresh water condenser 412, and a predeaeration chamber 602 are housed within evaporator/condenser shell 600. The warm sea water from warm sea water pumping system 402 is input to the predeaeration chamber 602. Within the predeaeration chamber 602, non-condensible gases are separated from the warm sea water and the non-condensible gases are either returned in the warm water discharge pipe 622 or returned to the ocean or the atmosphere by the vacuum system 540.

The warm sea water passes from the predeaeration chamber 602 to the flash evaporator 406 via a flash evaporator spout 408 thereby producing water vapor and mist within the flash evaporator 406. Flow control valve 710 controls the flow of warm sea water into the flash evaporator 406. The mist eliminator 410 is physically attached to the evaporator/condenser shell 600 and a separation wall 606, and separates the flash evaporator 406 from the fresh water condenser 412.

The mist eliminator 410 traps mist on the flash evaporator side and only allows water vapor to pass through such that the water vapor may be condensed in fresh water condenser 412. The fresh water condenser 412 includes the plurality of condenser tubes 538 and the condensed water vapor is collected at a rate of 17,500 pounds per minute, as discussed above with respect to FIG. 4(a).

In an effort to reduce the quantity of non-condensible gases revode by the vacuum system 540, a predeaeration chamber 602 is employed. Seed bubbles provide a catalyst for the further evolution of non-condensible gases in the predeaeration chamber 602. These seed bubbles may be collected from the warm sea water intake, the warm sea water discharge, or from the atmosphere. These three alternatives are illustrated in FIG. 6(a).

In order to collect the seed bubbles from the warm sea water intake, the warm sea water passes through a choke segment 612 and then enters the predeaeration chamber 602. At the choke segment 612, the pressure is decreased due to the restriction in diameter and the seed bubbles of the non-condensible gases are generated. In addition to the production of seed bubbles, the choke segment 612 provides for a greater evolution of non-condensible by creating a low pressure point in the warm sea water intake flow.

The seed bubbles can also be supplied by providing a pipe with a check valve 642 to the atmosphere.

Figure 6:
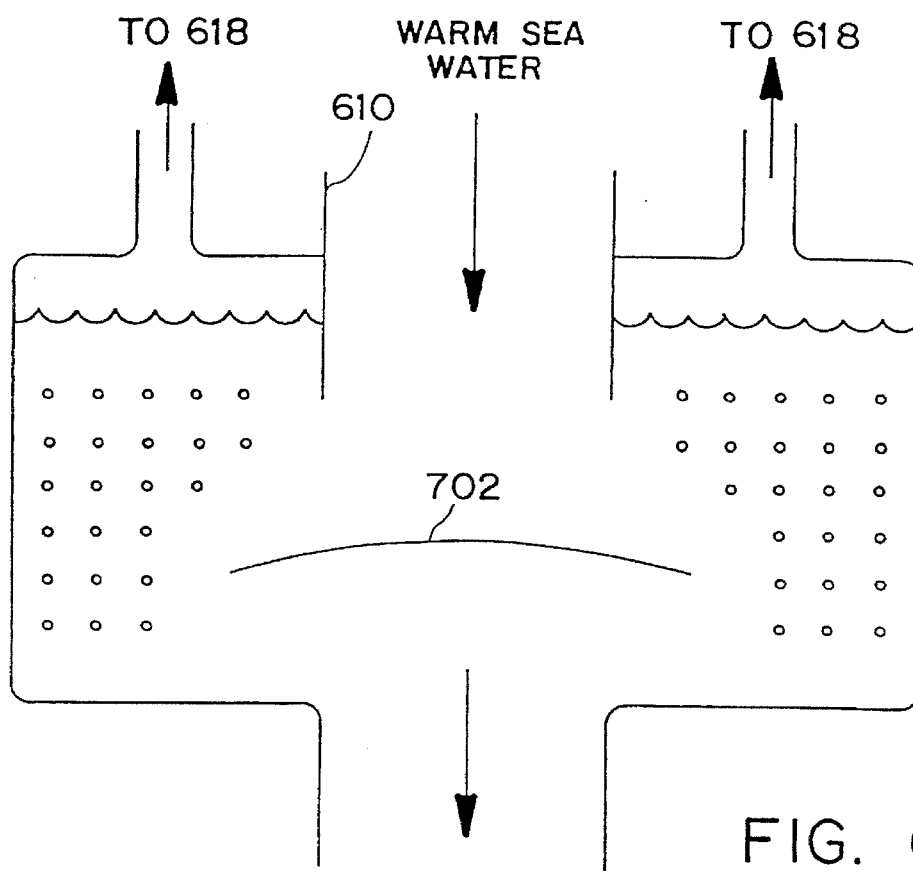
FIGS. 6(b) through 6(d) illustrate three alternatives for collecting seed bubbles for evolving non-condensible gases.
Figure 6:
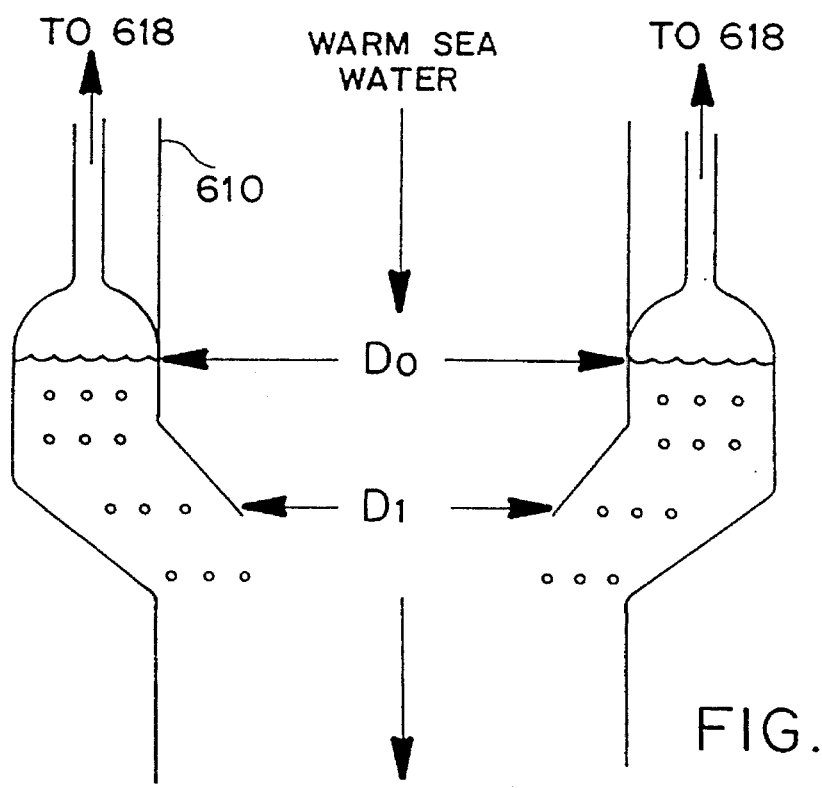
Figure 6D:
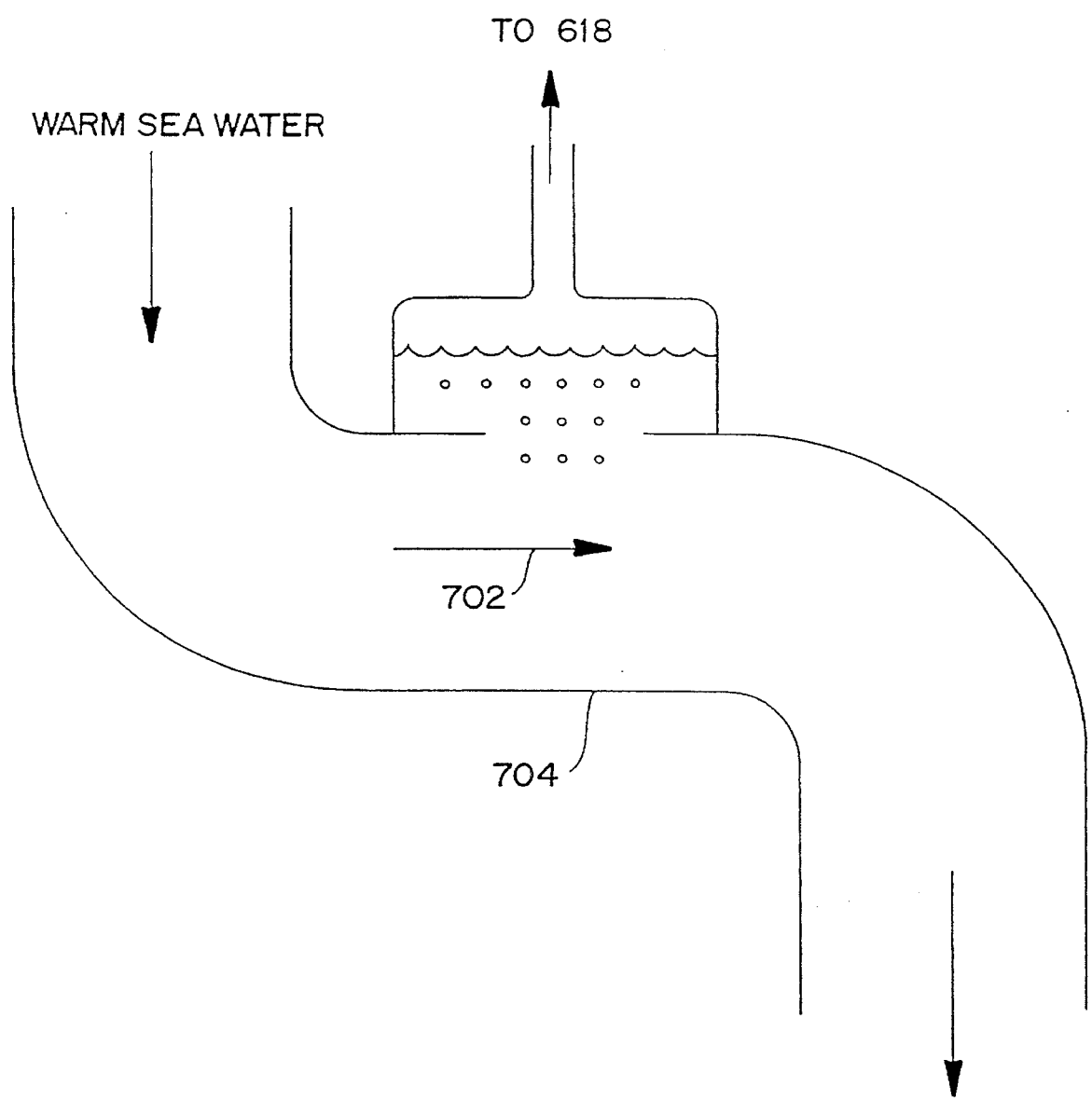

The seed bubbles can also be supplied from the warm sea water discharge using the three techniques illustrated in FIGS. 6(*b*)–(*d*). In FIG. 6(*b*), the diameter of the warm sea water outlet flow pipe 610 is reduced from $D_0$ to $D_1$ to create a stagnant region immediately downstream of D1 to separate the seed bubbles of the non-condensible gases from the warm water discharge. The seed bubbles are carried by the seed bubble pipe 614 and the seed bubble injection system 618 to the predeaeration chamber 602.

In another preferred embodiment as illustrated in FIG. 6(*c*), a baffle 702 is placed in the warm sea water inlet flow pipe 610 to create a stagnant region due to the obstruction of the baffle 702 and the enlarged diameter of the pipe in this region. The separated seed bubbles of the non-condensible gases are input to predeaeration chamber 602 via the seed bubble pipe 614 and the seed bubble injection system 618.

In another preferred embodiment as illustrated in FIG. 6(*d*), a region of zero vertical velocity 702 is created by horizontal pipe section 704, wherein the natural buoyancy of non-condensible gases allow separation from the warm sea water discharge to occur, generating seed bubbles, which are collected in region 706. The seed bubbles are then input to the predeaeration chamber 602 via the seed bubble pipe 614 and the seed bubble injection system 618.

The predeaeration chamber 602 functions to remove as much of the non-condensible gases (NGC) from the warm sea water prior to introduction to the flash evaporator 406. The percentage of the non-condensible gases which are removed from the warm sea water is a function of three parameters: the pressure in the predeaeration chamber 602, the length of time the warm sea water spends in the predeaeration chamber 602, and the cross sectional area of the predeaeration chamber 602.

The predeaeration chamber 602 illustrated in FIG. 6(*a*) further includes baffle 616, which routes the warm sea water in an indirect fashion to the flash evaporator spouts 408. This extends the period of time the warm sea water is in the predeaeration chamber 602. As a result, the warm sea water has a greater residency time in the predeaeration chamber 602 and is more heavily seeded with bubbles, which triggers a higher percentage of non-condensible gases to be evolved and carried away at the top of the predeaeration chamber 602.

The non-condensible gases which have gathered at the top of the predeaeration chamber 602 are then removed by the NCG removal pipes 620. The warm sea water discharge is then utilized to compress the non-condensible gases so that they may be either discharged at atmospheric pressure or reabsorbed into the warm sea water discharge released back into the ocean or atmosphere.

The NCG removal pipes 620 which remove the non-condensible gases from the predeaeration chamber 602 are extended down the warm water discharge pipe 622 with a vertically-movable extension 624 to such a depth that the pressure in the warm water discharge pipe 622 is incrementally less than the desired pressure in the predeaeration chamber 602. In this way, the removed condensible gases will flow from the predeaeration chamber 602 into the warm water discharge pipe 622. This extension 624 can be moved vertically up and down so that this pressure can be regulated. The velocity of the vertical bubble rise in the warm sea water is less than the velocity of the warm sea water discharge in the down pipe 622 so that the bubbles will be forced down with the discharge flow and become compressed as the pressure in the water increases.

Figure 7:
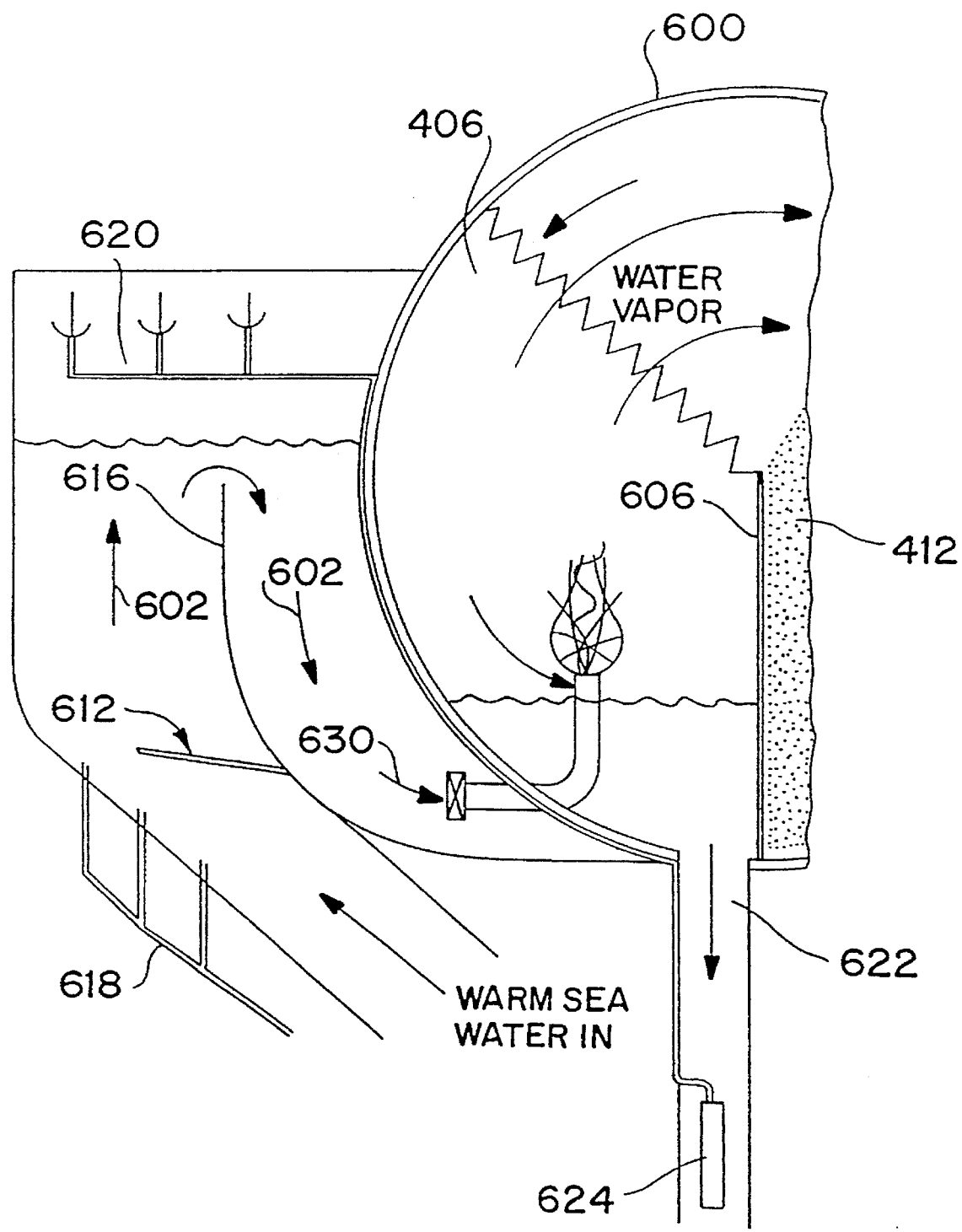
FIGS. 7 illustrates another embodiment of the novel combined evaporator/condenser for the OTEC system illustrated in FIGS. 4(a) and 4(b)

FIG. 7 illustrates an alternative embodiment of the evaporator/condenser 404 of FIG. 6(*a*). FIG. 7 and FIG. 6(*a*) include numerous common elements, which have been given the same numerals, and whose description is omitted here. The predeaeration chamber 602 is placed outside the shell 600 and above the evaporation spouts 408. This configuration increases NCG removal because the warm sea water spends more time in the predeaeration chamber 602. The larger volume of the predeaeration chamber 602 and its elevation above the evaporator spouts 408 provides additional control over the pressure inside the flash evaporator 406.

In order for the OTEC system of the present application to continuously produce fresh water from fresh water condenser 412, it is important that the pressure within the flash evaporator 406 be controlled near 0.3 psia. Since the flash evaporator 406 includes multiple flash evaporator spouts 408, it also is necessary to maintain a constant pressure at each of the flash evaporator spouts 408. If the pressure in the flash evaporator 406 is too far above 0.3 psia, then not enough steam will be generated. If the pressure is too far below 0.3, the steam can not reach the last condenser tube 412 and the steam begins to accumulate and cause the removal of the non-condensible gases to cease. The OTEC system of the present application typically operates with a pressure of 0.3 psia ± 0.05.

Figure 8:
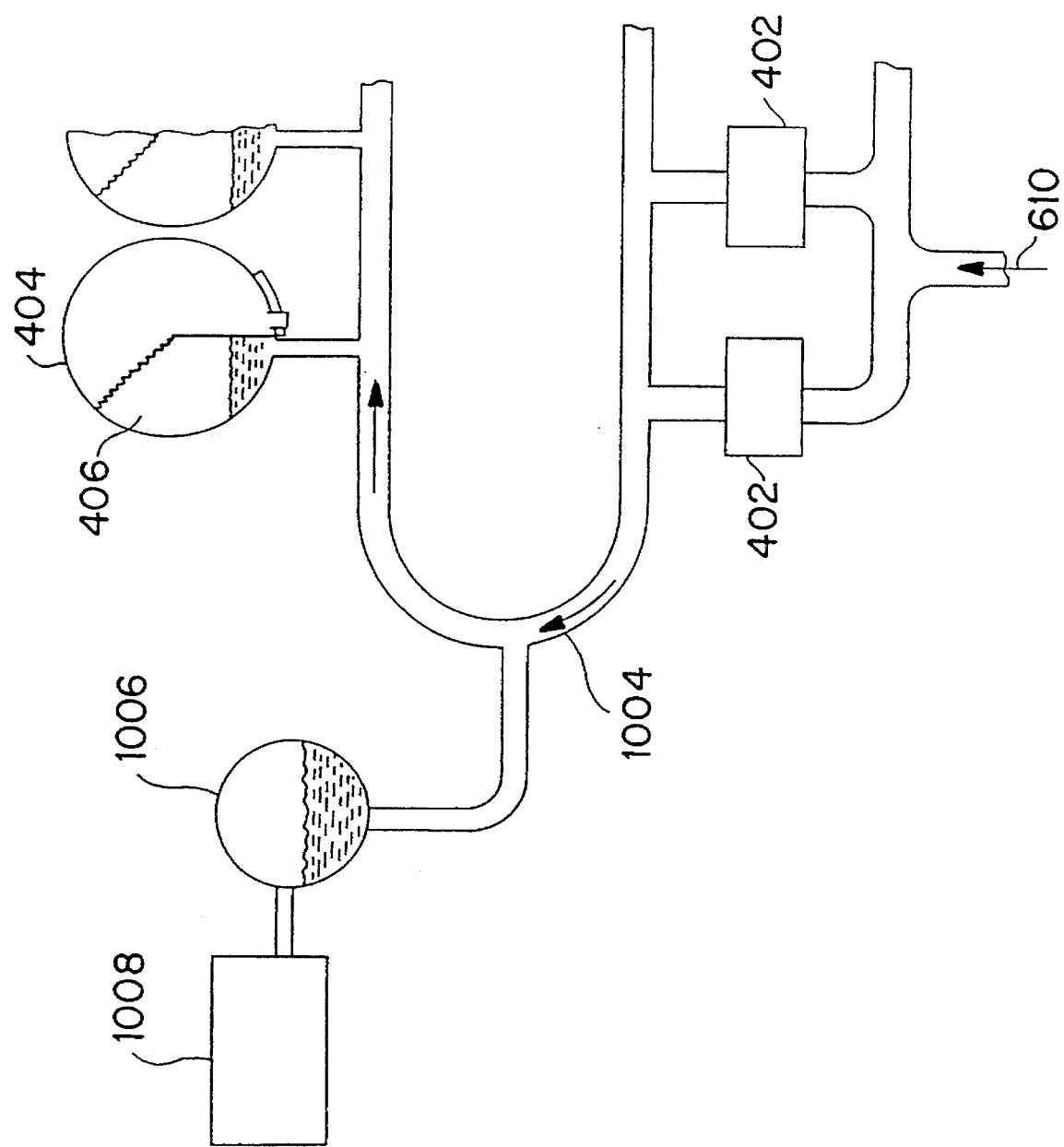
FIGS. 8 illustrates a reservoir system for use in the OTEC system illustrated in FIGS. 4(a) and 4(b)

The evaporator/condenser 404 of the present application requires relatively steady flow rates and pressures. In order to maintain control over the pressure within the flash evaporator 406 and across each of the flash evaporator spouts 408, a configuration such as the one illustrated in FIG. 8 is utilized. The warm sea water inlet pipe 610 carries warm sea water into pumps 402. Were pumps 402 directly connected to each of the flash evaporators 404, voltage variations in the pumps 402 would directly and adversely affect the amount of water vapor being generated within the flash evaporator 406. These variations could cause the pressure within the flash evaporator 406 to vary too far from 0.3 psia, which would result in the generation of too much or too little steam, as discussed above.

Therefore, in one embodiment of the preferred invention, the output of warm sea water from each of the pumps 402 is fed together in pipe 1004, which feeds each flash evaporator 406. A static reservoir 1006 and compressed air source 1008 finely regulate the pressure in the flash evaporators 406.

Figure 9:
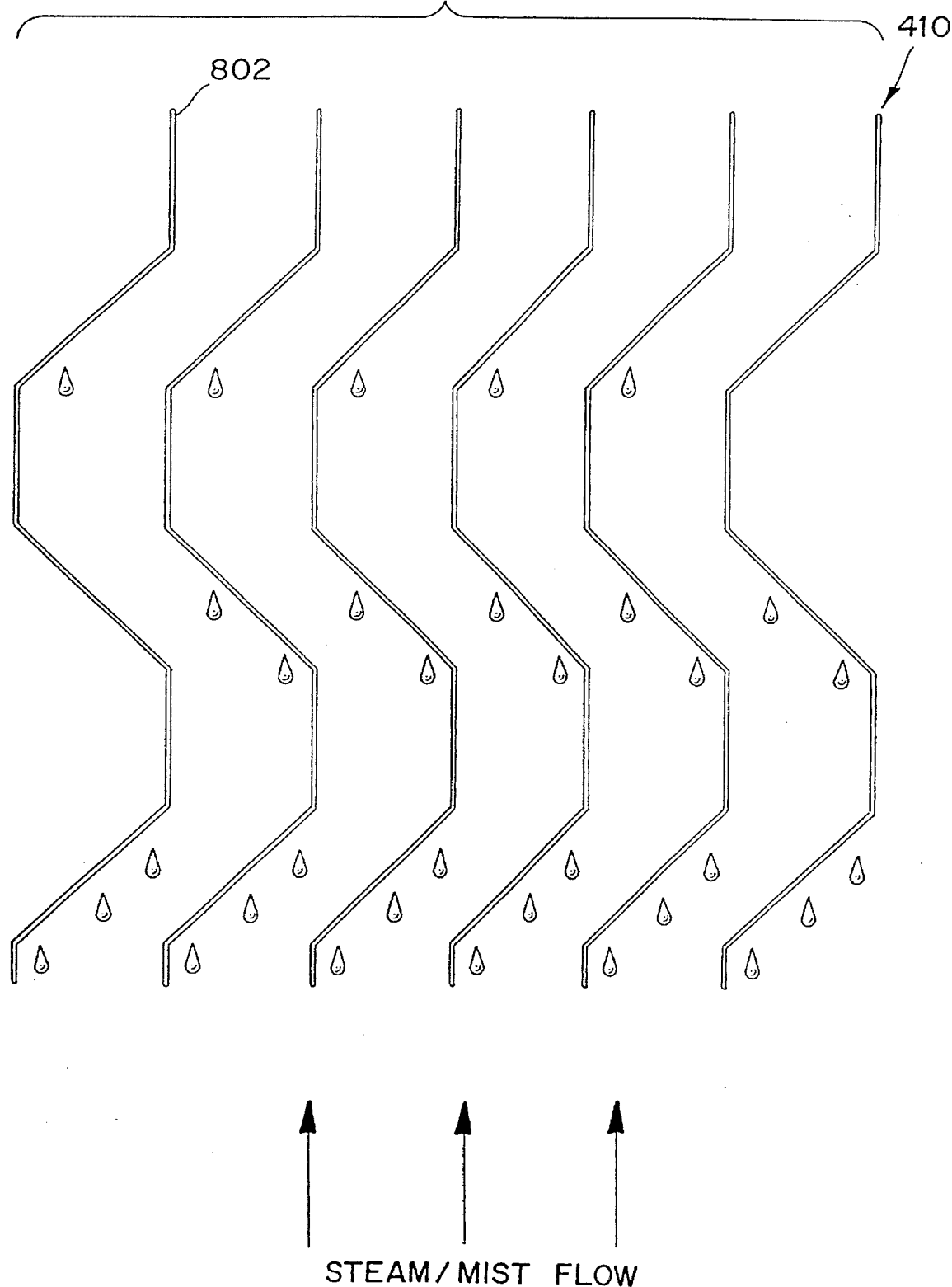
FIG. 9 illustrates a mist eliminator of FIG. 4(a) in one embodiment of the present invention.

In one preferred embodiment, as illustrated in FIG. 9, the mist eliminator 410 is a three pass chevron-style mist eliminator wherein each wall element 802 is 9.68 inches in length and 1.5 inches apart. The water vapor and mist from the flash evaporator 406 are input to the flash evaporator side of the mist eliminator 410. As the combined water vapor and mist flows across the chevron-shaped wall elements 802 of the mist eliminator 410, the larger droplets of mist contact the wall elements 802 of the mist eliminator 410 and fall to the bottom of the flash evaporator 406, where they become part of the warm water discharge. The mist eliminator 410 allows the water vapor to pass through such that the water vapor may be condensed in the fresh water condenser 412.

Figure 10:
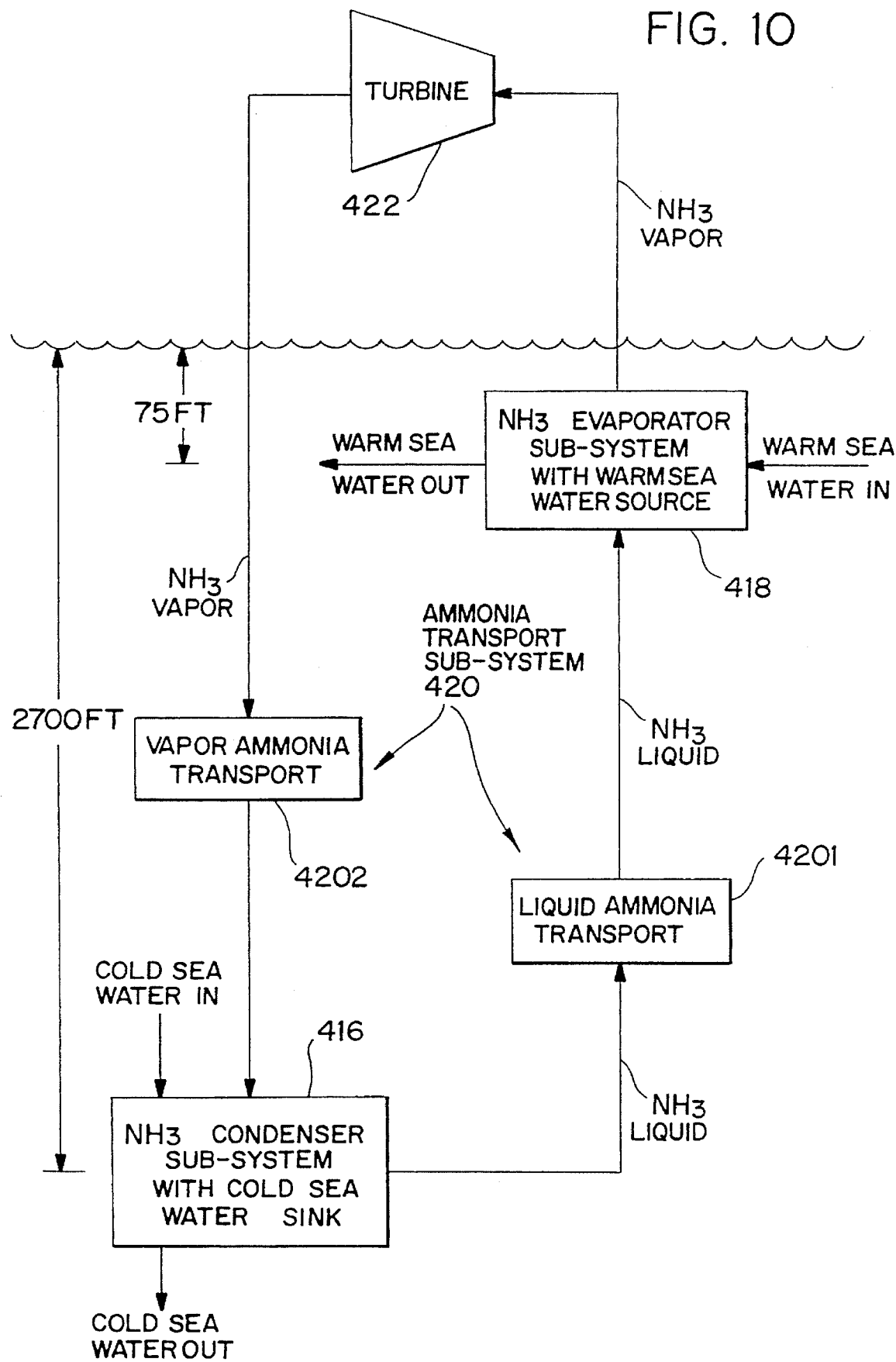
FIG. 10 illustrates an alternative embodiment of the energy generation system illustrated in FIG. 4(b)

FIG. 10 illustrates an energy generation system which is an alternative embodiment of the energy generation system of FIG. 4(*b*). The energy generation system illustrated in FIG. 10 may be utilized in conjunction with the desalination system of FIG. 4(*a*), where warm sea water pumping system 402 and cold sea water pumping system 414 are not required, as will be discussed below.

As illustrated in FIG. 10, an ammonia evaporator subsystem 418 is located at a depth of approximately 75 feet from the ocean surface. This depth is selected depending on a natural depth and desired temperature of the warm sea water which is required as a warm sea water heat source. The warm sea water enters the ammonia evaporator sub-system 418 and heats liquid ammonia delivered by liquid ammonia transport 4201 of ammonia transport sub-system 420 to produce ammonia vapor and a warm water discharge. The ammonia vapor is input to electric generation sub-system 422 in order to produce electricity. The electric generation sub-system 422 is located above the ocean surface. The ammonia vapor exiting the electric generation sub-system 422 is input to the ammonia condenser sub-system 416 via vapor ammonia transport 4202 of ammonia transport sub-system 420, which is located at a natural depth of the desired cold sea water heat sink. In a preferred embodiment of the present invention, the ammonia condenser sub-system 416 is located at a depth of 2700 feet from the ocean surface.

The cold sea water at a depth of 2700 feet is input to ammonia condenser sub-system 416 as a cold sea water heat sink and the ammonia condenser sub-system 416 outputs a cold seawater discharge and liquid ammonia. This liquid ammonia is recycled back to the ammonia evaporator sub-system 418 via the liquid ammonia transport 4201 of the ammonia transport sub-system 420 in order to complete the closed cycle ammonia path.

Locating the ammonia evaporator sub-system 418 at a natural depth where the desired warm sea water intake is available, alleviates the need for deployment of numerous large sea water pipes and reduces the energy cost required to pump the warm sea water to the ammonia evaporator sub-system 418. Instead of pumping water from a different depth, the warm water at the proper depth is merely pumped through the ammonia evaporator sub-system 418. Similar reductions in piping and energy costs are realized by locating the ammonia condenser sub-system 416 at a natural depth where the required cold sea water intake is readily available. In the embodiment illustrated in FIG. 10, only the ammonia is pumped to different depths, not the warm and cold sea water. Since the mass flow rate of the ammonia vapor/liquid is much smaller than either of the mass flow rate of the warm sea water or the cold sea water, significant energy is saved by only pumping the ammonia vapor/liquid to different depths.

As illustrated in FIG. 10, the ammonia condenser sub-system 416 is located in deep water. The ammonia condenser sub-system 416 must be properly anchored to withstand the pressure at such a depth.

As illustrated in FIG. 10, the ammonia evaporator sub-system 418 is located near the surface of the ocean, in shallow warm water, and the electric generation sub-system 422 is located above the ocean surface. Since the electric generation sub-system 422 generates electricity, it must be connected to on shore power distribution centers via power lines.

Figure 11:
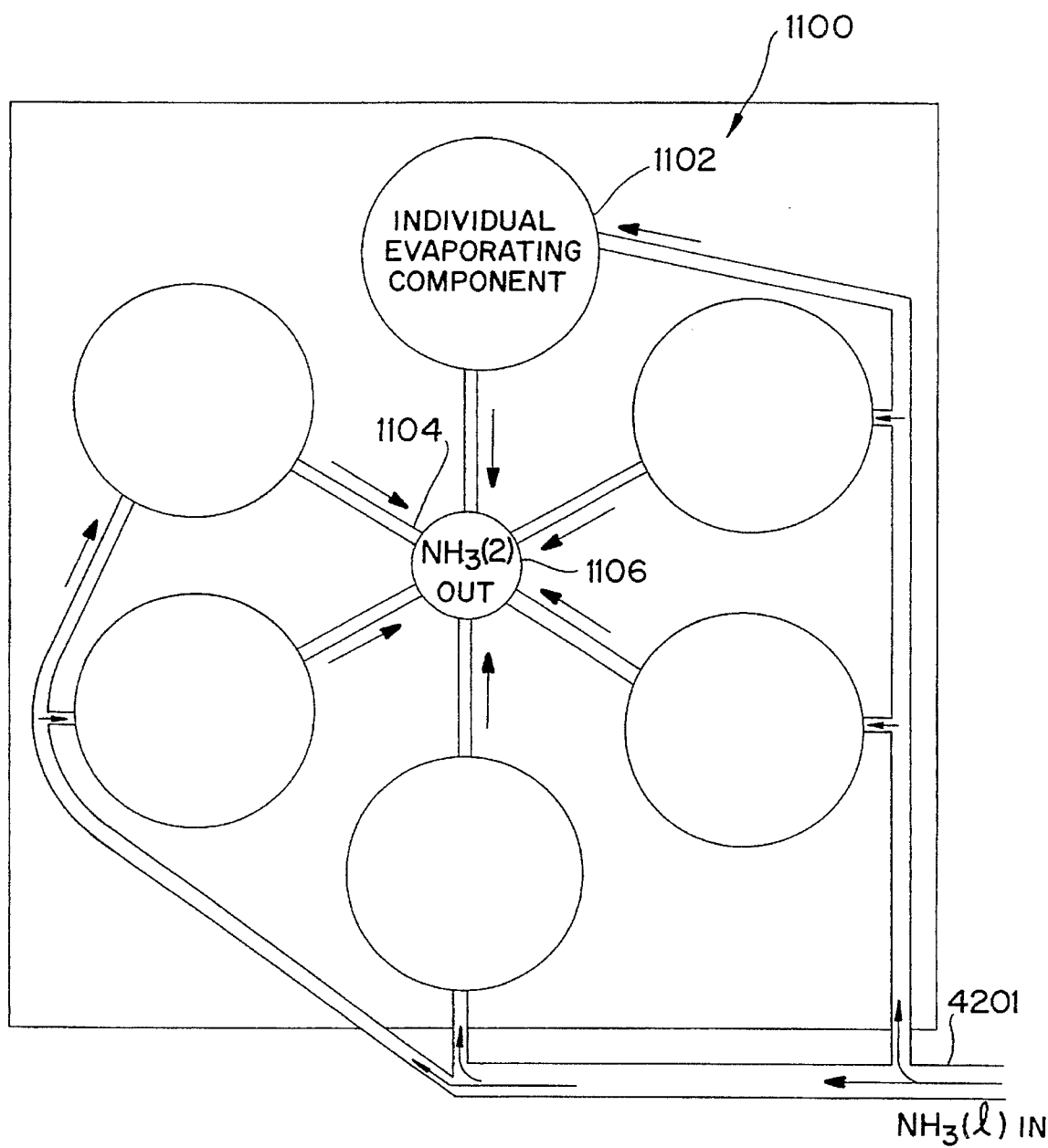
FIG. 11 illustrates an evaporator template of the ammonia evaporator sub-system.
Figure 12:
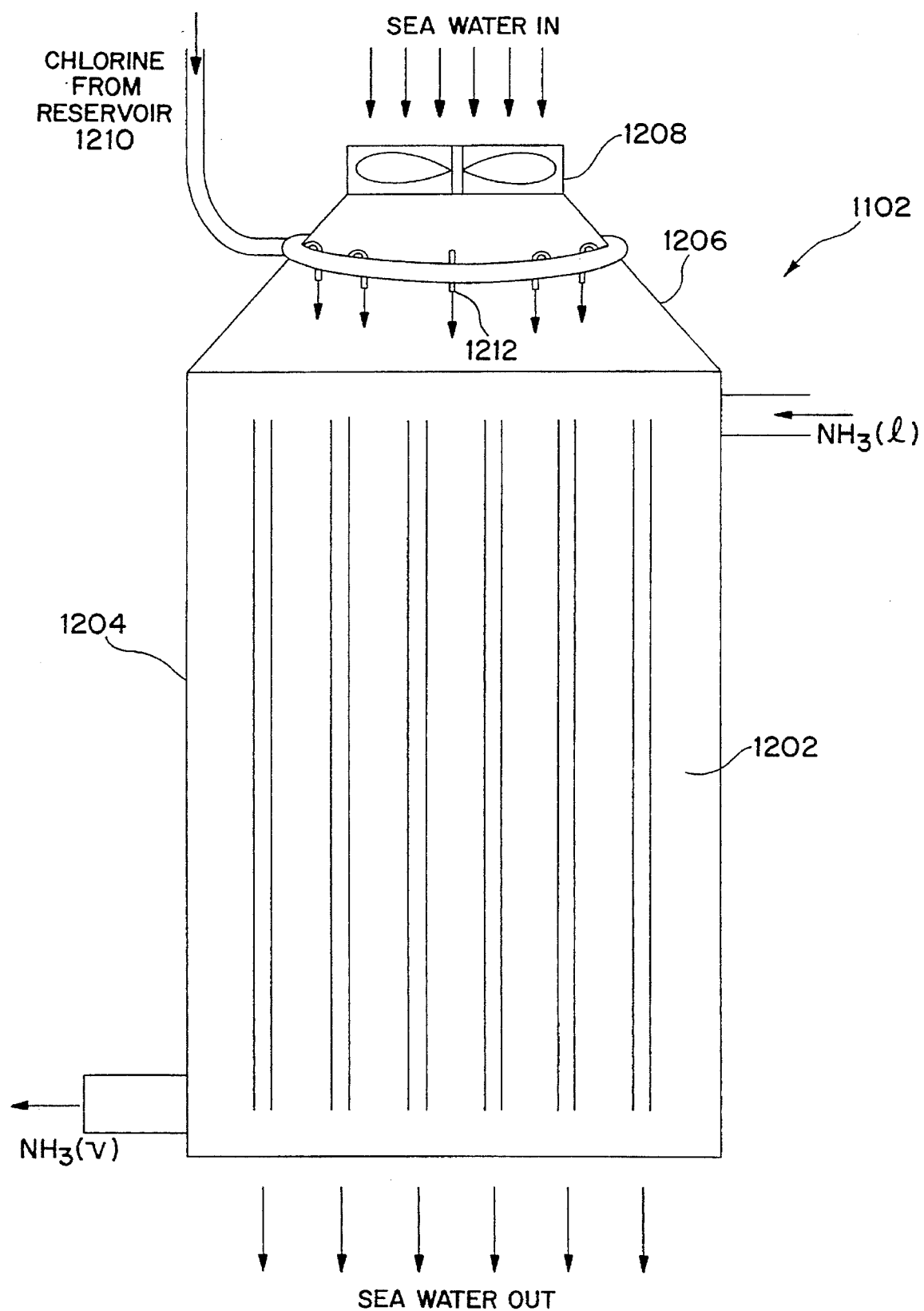
FIGS. 12 and 13 illustrate an individual evaporating component of the evaporator template of FIG. 11.

The ammonia evaporator sub-system 418 receives liquid ammonia from the liquid ammonia transport 4201 of the ammonia transport sub-system 420, distributes the liquid ammonia among a plurality of evaporator templates 1100, illustrated in FIG. 11. In a preferred embodiment, the ammonia evaporator sub-system 418 includes four evaporator templates 1100. Further, as illustrated in FIG. 11, each evaporator template 1100 includes six individual evaporating components 1102, into which the liquid ammonia is distributed. An individual evaporating component 1102 is illustrated in FIG. 12. Each individual evaporating component 1102 chlorinates entering warm sea water to deter biofouling inside the tubes 1202. The ammonia evaporator sub-system 418 collects and delivers the vaporized ammonia to the electric generation sub-system 422. The ammonia evaporator sub-system 418 receives 102,000 lbs/min of liquid ammonia from the liquid ammonia transport 4201 of the ammonia transport sub-system 420 and distributes the liquid ammonia among the 24 individual evaporating components 1102.

The individual evaporating components 1102 are of the shell and tube type with ammonia on the shell side and naturally occurring warm sea water on the tube side. Each individual evaporating component 1102 is aligned vertically in such a way that the warm sea water flows in the direction of gravity. This serves two purposes. One, the warm sea water inlet is closer to the ocean surface, i.e. in more shallow water, this makes the sea water temperature slightly higher than it would be for a horizontally inclined unit. Second, the warm sea water discharge will be slightly cooler than the ambient sea water, and, as a result, will have a higher density and a consequent tendency to sink. Since it is desirable to move the discharge such that it does not contaminate further inlet sea water with thermal cooling, it is advantageous to force the cooler water down in accordance with its natural physical movements. A vertical alignment ensures this occurs.

Each of the 24 individual evaporating components 1102 has a tube 1202 inner diameter of 0.715 inches and a tube 1202 outer diameter of 0.75 inches, includes 19,000 tubes 1202 in the cylinder with a pitch of approximately 1.25, and has a tube length of 18 feet. Further, the shell 1204 is 18 feet long with an inner diameter of 11.2 feet, a wall thickness of greater than 1 inch, and an outer diameter of approximately 11.4 feet.

The sea water enters the tubes 1202 via an inlet cone 1206, situated at an upper end of each individual evaporating component 1102. The inlet cone 1206 is 60 inches in diameter and extends uniformly at a 30 degree angle to reach the 134.4 inch diameter of the shell 1204. There is no sea water outlet cone or manifold, as discussed above, the sea water discharge simply exits downward into the ambient environment.

In order to facilitate adequate rates of heat transfer by assuring sufficient water side convective heat transfer coefficients, sea water pumps 1208 are employed. Reliance on natural convention or irregular sea water currents to continually move and displace the sea water would result in heat transfer coefficients which are both unpredictable and considerably lower than the forced convection design of FIG. 12. Since the overall heat transfer coefficient is inversely proportional to evaporator surface area, the sea water pumps 1208 are crucial to keeping the number of tubes 1202 to a reasonable level.

Each individual evaporator component 1102 requires a warm sea water flow rate of 815,000 lbs/min. The water enters at a temperature of approximately 80° F. and exits 1208 at a temperature 3.6° F. cooler or approximately 77.4° F. The sea water pumps have a large diameter, are axial, have a low head, and a high-flow rate, and are situated directly in front of the inlet cone 1206. Each sea water pump 1208 includes a motor connected to the electric generation sub-system 422 by appropriate electric cabling.

The entering warm sea water may be chlorinated in one of two ways. The first includes a molecular chlorine reservoir 1210 located at the ocean surface or at the evaporation depth, which feed chlorine injection ducts 1212, located circumferentially around the sea water inlet cone 1206. In this manner, the entering warm sea water flowing through the tubes 1202 has sufficient rates of chlorination to resist the growth of biological organisms. The chlorine injection may occur intermittently, i.e. one hour per day, at moderate rates i.e., 100 parts per billion (ppb), or continuously at lower rates such as 35 to 50 ppb. These injection rates depend on the type of tube material, site location, and time of year.

Figure 13:
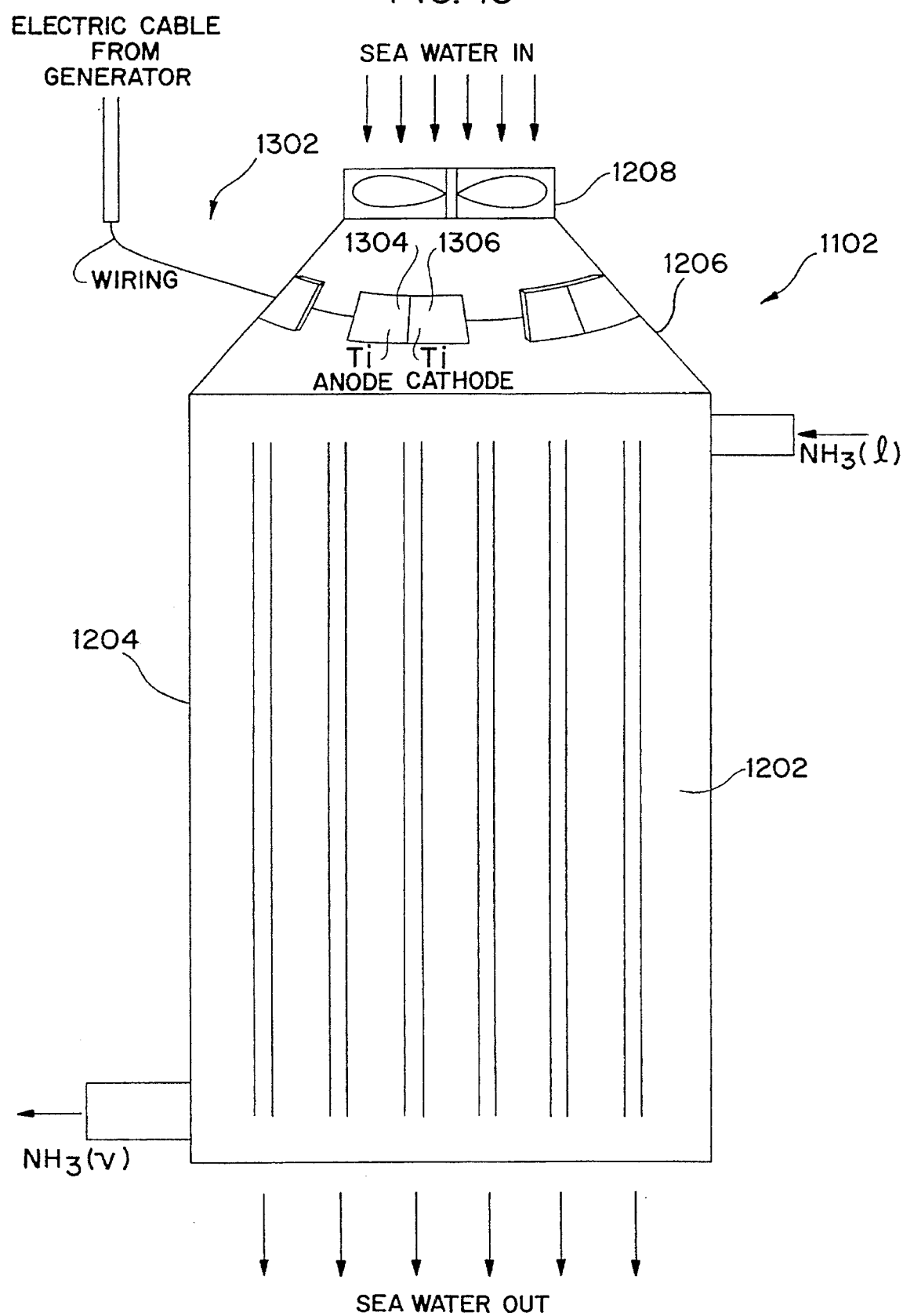

A second method of chlorinating the entering warm sea water is illustrated in FIG. 13 and includes an electrolytic system 1302 utilizing platinized titanium anodes 1304 and titanium cathodes 1306 to electrolyze a percentage of dissolved salt in the sea water to form sodium hypochlorite, which is as effective as molecular chlorine in deterring biofouling. Such an electrolytic system 1302 may also be employed continuously or intermittently, as discussed above.

The vaporized ammonia exits each individual evaporating component 1102 and is carried via a network of steel tubes and pipes 1004 to one of four (4) five foot inner diameter steel pipes 1106. These pipes 1106 transport the ammonia vapor above the ocean surface to the electric generation sub-system 422.

Figure 14:
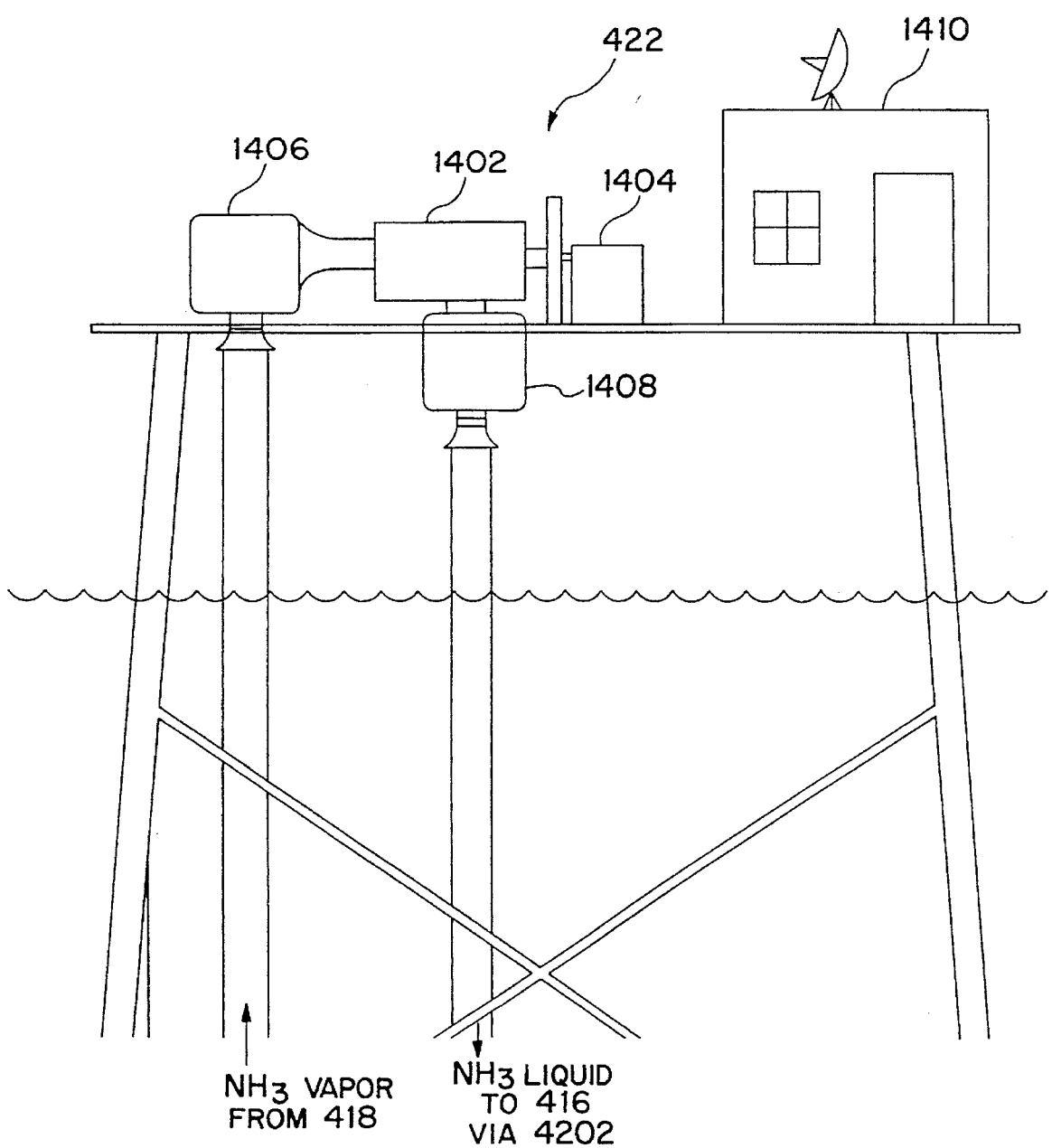
FIG. 14 and 15 illustrate the electric generation sub-system of the energy generation system illustrated in FIG. 10.
Figure 15:
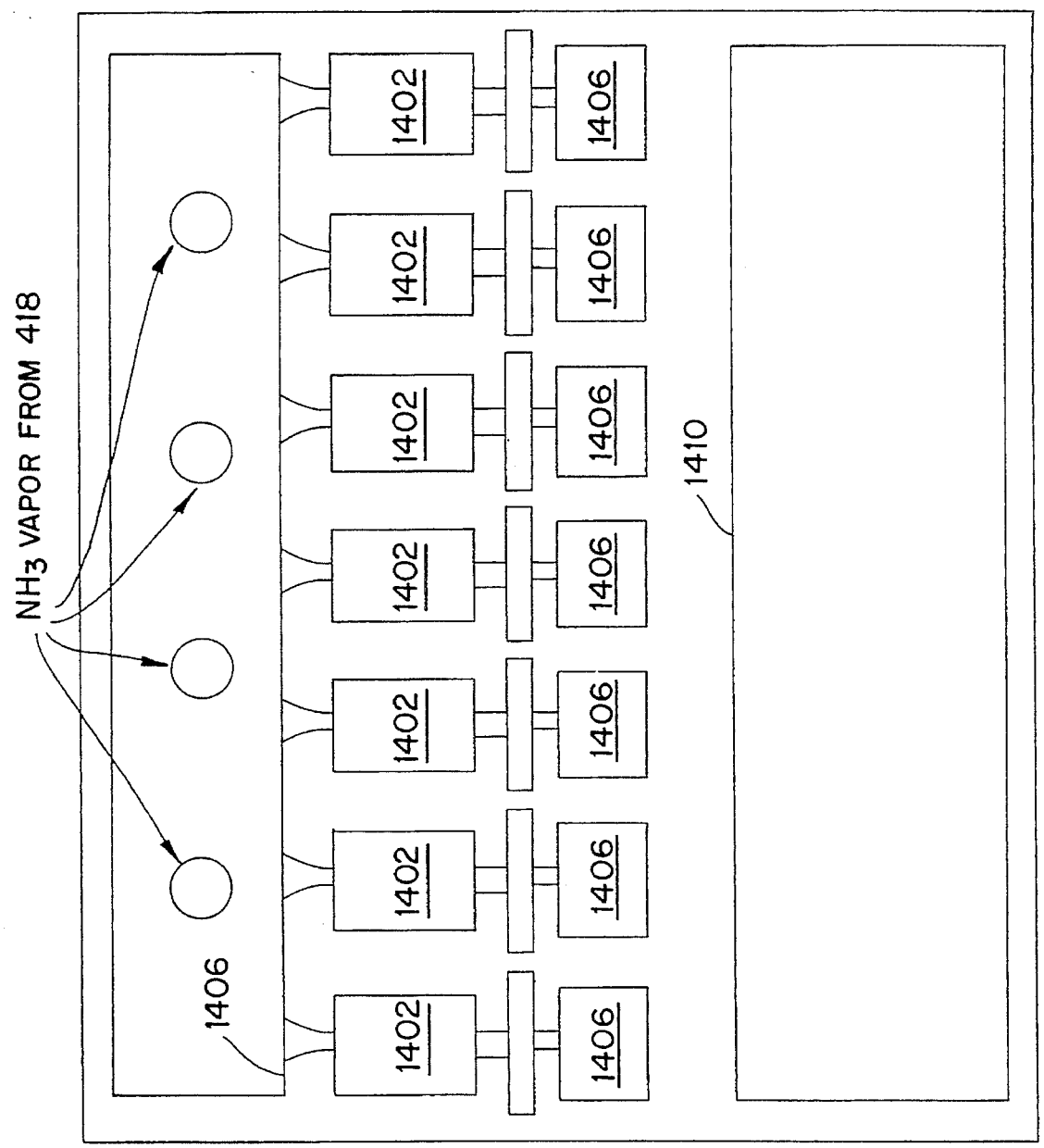

The electric generation sub-system 422 illustrated in FIGS. 14 and 15, includes seven ammonia vapor turbine expanders 1402, seven corresponding generators 1404, an inlet manifold system 1406, an outlet manifold system 1408, a control center 1410, and electric transformers (not shown). The turbine expanders 1402 take thermodynamic energy from the ammonia vapor and transform it into mechanical energy. The ammonia vapor enters each turbine expander 1402 as a high pressure, high enthalpy, completely vaporized yet saturated vapor and exits at a lower pressure, a lower temperature, and a lower enthalpy. The extracted energy is transferred into rotational force of a shaft leading to one of the corresponding generators 1404. Each generator 1404 transforms this mechanical energy into electricity in a conventional manner. The electric transformers alter the generated electricity to such a voltage and frequency that it can be supplied to a local grid and to parts of the OTEC system which require electricity, namely the sea water pumps 1208 and liquid ammonia pumps 1704 (to be described later). The saturated exit vapor from the seven ammonia vapor turbine expanders 1402 enters an outlet manifold system 1408 which distributes the saturated exit vapor to the vapor ammonia transport 4202 of the ammonia transport subsystem 420. As discussed above with respect to FIG. 10, the ammonia transport sub-system 420 includes two sets of pipelines, the vapor ammonia transport 4202 and the liquid ammonia transport 4201.

The vapor ammonia transport 4202 carries vaporous ammonia from the electric generation sub-system 422 to the ammonia condenser sub-system 416. The vapor ammonia transport 4202 includes four separate pipelines each transporting an equal one fourth of the 102,000 lbs/min flow of ammonia vapor. The inner diameter of each pipeline is five feet and the pipelines are made of carbon steel.

Figure 16A:
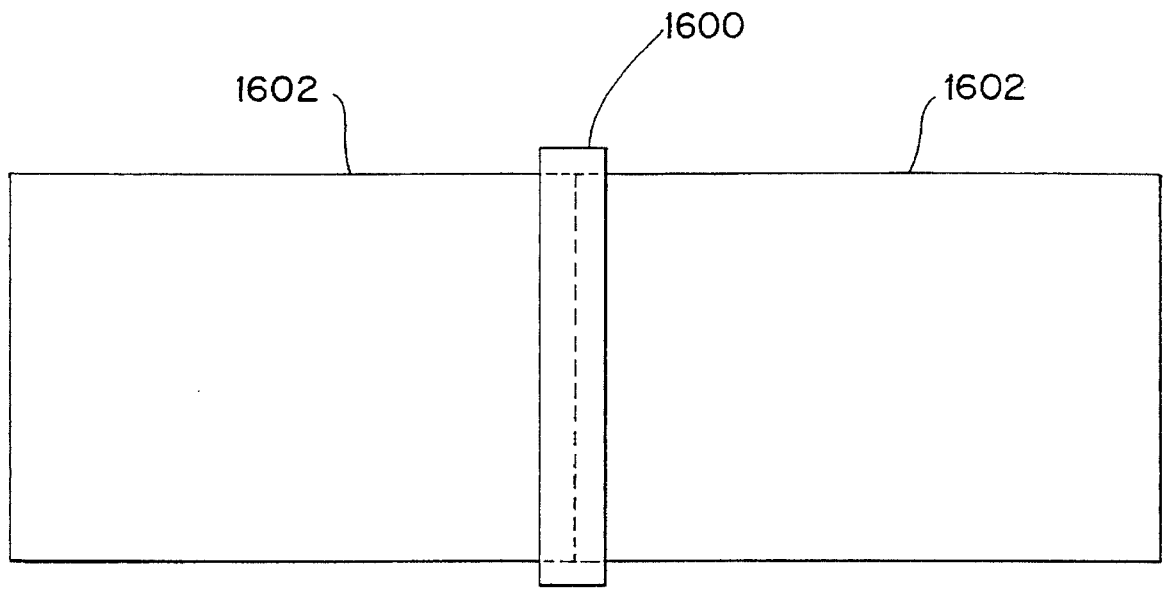
FIG. 16(a) and 16(b) illustrate two views of a buckling resistor reinforcement.
Figure 16B:
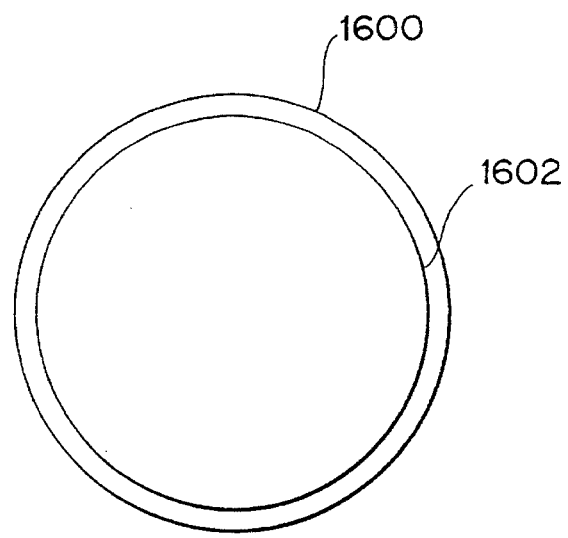

The pressure inside the pipelines remains nearly constant at approximately 95 psia. Because the vapor ammonia transport pipelines extend to depths of almost 3,000 feet, the net external pressure is very large. In order to resist buckling, the pipewall thickness must become gradually larger as the pipe extends deeper and the external hydrostatic pressure becomes greater. The range of wall thicknesses and segment lengths for these pipelines varies from one inch and 40 feet at the ocean surface to 2.25 inches and 10 feet at the ammonia condenser sub-system 416 depth. In addition, a buckling resistor reinforcement 1600, illustrated in FIG. 16(a) and 16(b), is included on each of the carbon steel pipe segments 1602.

The liquid ammonia transport includes a single pipeline 4201 extending from the ammonia condenser sub-system 416 in the cold seawater region to the ammonia evaporator sub-system 418 in the warm sea water region. The single pipeline 4201 has a constant inner diameter of 2.5 feet and is also made of carbon steel. Like the vapor ammonia transport 4202 pipelines, the single liquid ammonia transport 4201 pipeline wall thickness and segment length vary as a function of depth, in this case from 1.00 inch and 15 feet at the ammonia condenser sub-system 416 depth to 0.25 inches and 40 feet at the ammonia evaporator sub-system 418 depth.

Figure 17:
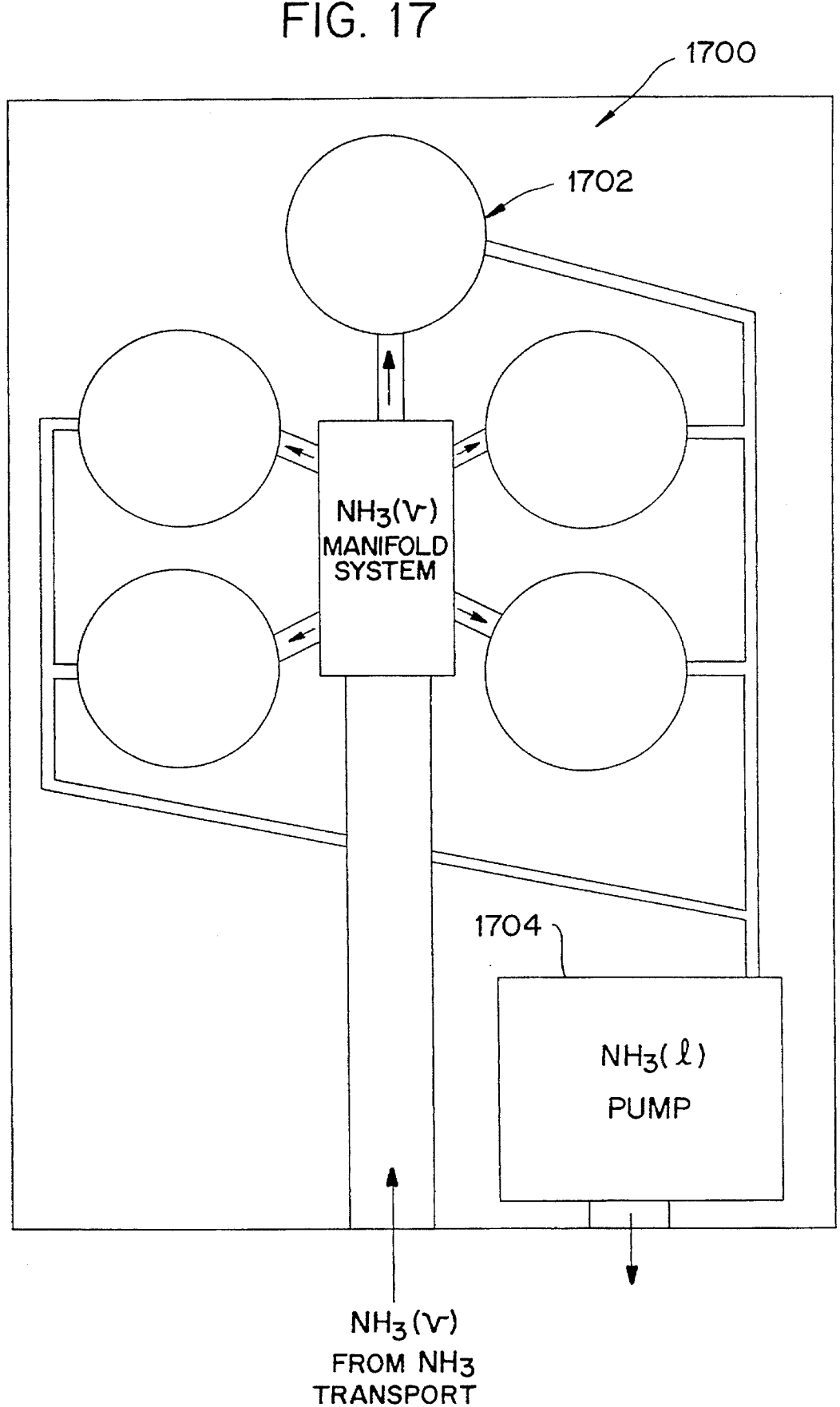
FIG. 17 illustrates a condenser template of the ammonia condenser sub-system.
Figure 18:
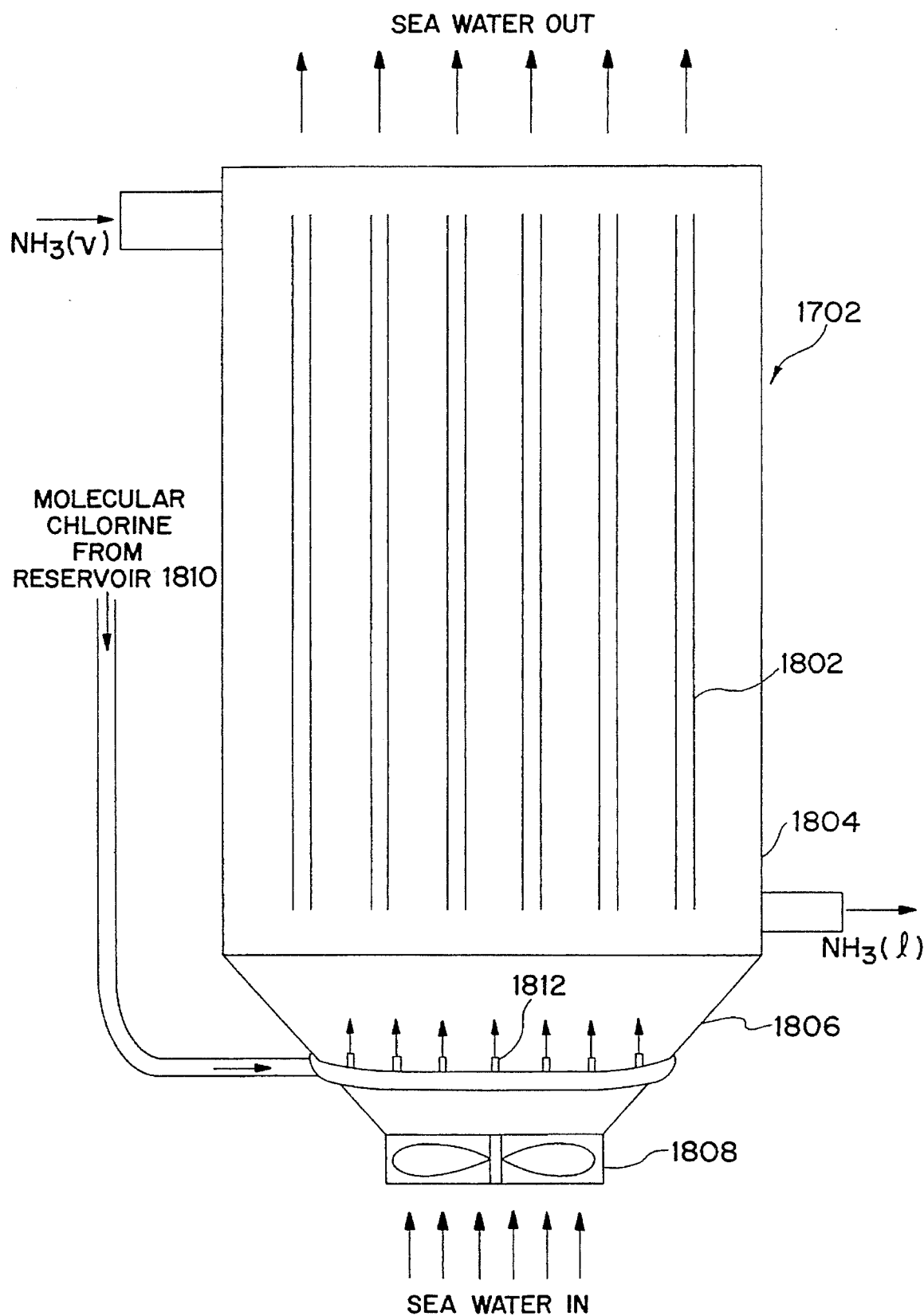
FIGS. 18 and 19 illustrate an individual condensing component of the condenser template of FIG. 16.

The ammonia condenser sub-system 416 receives vaporous ammonia from the vapor ammonia transport 4202 of ammonia transport sub-system 420, distributes the vaporous ammonia among a plurality of condenser templates 1700 illustrated in FIG. 17. In a preferred embodiment, the ammonia condenser sub-system 416 includes four condenser templates 1700. Further, as illustrated in FIG. 17, each condenser template 1700 includes five individual condensing components 1702, into which the ammonia vapor is distributed. A individual condensing component 1702 is illustrated in FIG. 18. Each individual condensing component 1702 chlorinates the entering cold sea water to deter biofouling inside tubes 1802 of the individual condensing components 1702. The ammonia condenser sub-system 416 collects the liquid ammonia and returns the liquified ammonia to the ammonia evaporator subsystem 418 via the ammonia transport system 420.

The ammonia condenser sub-system 416 receives the 102,000 lbs/min of ammonia vapor from the vapor ammonia transport 4202 of ammonia transport sub-system 420 and distributes it among the 20 individual condensing components 1702. These individual condensing components 1702 are of the shell and tube variety with ammonia on the shell side and naturally occurring cold sea water on the tube side. Each individual condensing component 1702 is aligned vertically in such a way that the cold sea water flows against the direction of gravity. This serves two purposes, as discussed above with respect to the individual evaporating components 1102. The first is that the sea water inlet is further from the ocean surface, i.e. in deeper water. This makes the inlet cold sea water temperature slightly lower than it would be for a horizontally inclined unit. Second, the sea water discharge is slightly warmer than the ambient sea water and as a result, will have a lower density and consequent tendency to rise. Since it is desirable to remove the cold sea water discharge and assure it does not contaminate further inlet sea water with thermal warming, it is advantageous to force the discharge cold sea water up in accordance with its natural physical movements. The vertical alignment assures this occurs.

Each of the 20 individual condensing components 1702 has a tube 1802 inner diameter of 0.695 inches and a tube 1802 outer diameter of 0.75 inches, 18,000 tubes 1802 in the cylinder with a pitch of approximately 1.25, and a tube length of 18.0 feet. The shell 1804 is also 18 feet long with an inner diameter of 10.8 feet and an outer diameter of approximately 11.8 feet.

The cold sea water enters the tubes 1802 via an inlet cone 1806 situated at a lower end of each of the individual condensing components 1702. The inlet cone 1806 is 60 inches in diameter and extends uniformly at a 30° angle to reach the 130.8 inch diameter of the shell 1804. There is no sea water outlet cone or manifold, as discussed above, the cold sea water discharge simply exits upward into the ambient environment.

In order to facilitate adequate rates of heat transfer by ensuring sufficient sea water side convective heat transfer coefficients, sea water pumps 1808 are employed. Reliance on natural convection or the irregular sea water currents to continually move and displace the sea water results in heat transfer coefficients which are both unpredictable and considerably lower than the forced convention design illustrated in FIG. 18. Since the overall heat transfer coefficient is inversely proportional to condenser surface area, the sea water pumps 1808 are crucial to keeping the number of tubes 1802 to a reasonable level.

Each individual condensing component 1702 requires a cold sea water flow rate of 742,700 lbs/min. The water enters at a temperature of approximately 43.9° F. and exits at a temperature of 3.9° F warmer or approximately 47.8° F. The sea water pumps 1808 have a large diameter, are axial, have a low head, a high flow rate, are submersible, and are situated directly in front of the inlet cone 1806. Each sea water pump 1808 includes a separate motor connected to the electric generation sub-system 422 by appropriate electric cabling.

The ammonia condenser sub-system 416 does not suffer from the same rates of biofouling as the ammonia evaporator sub-system 418. This is due the colder temperature and different chemical content of the seawater at the deeper depth. However, biofouling control is still needed to ensure a consistent rate of heat transfer.

As discussed above with respect to the ammonia evaporator sub-system 418, two options exist for the chlorination of the incoming cold sea water. The first option includes a molecular chlorine reservoir 1810 located at the ocean surface or at the ammonia condenser sub-system 416 depth which feed chlorine injection ducts 1812, located circumferentially around the entrance to the sea water inlet cone 1806. In this manner, the cold sea water is flowing through the tubes 1802 at a sufficient rate of chlorination to resist the growth of biological organisms. As discussed above, the chlorinating injection may occur intermediately (such as one hour per day) at moderate rates (100 ppb) or continuously at lower rates 35–50 ppb). These values are dependent on the choice of tube material, site location, and time of year.

Figure 19:
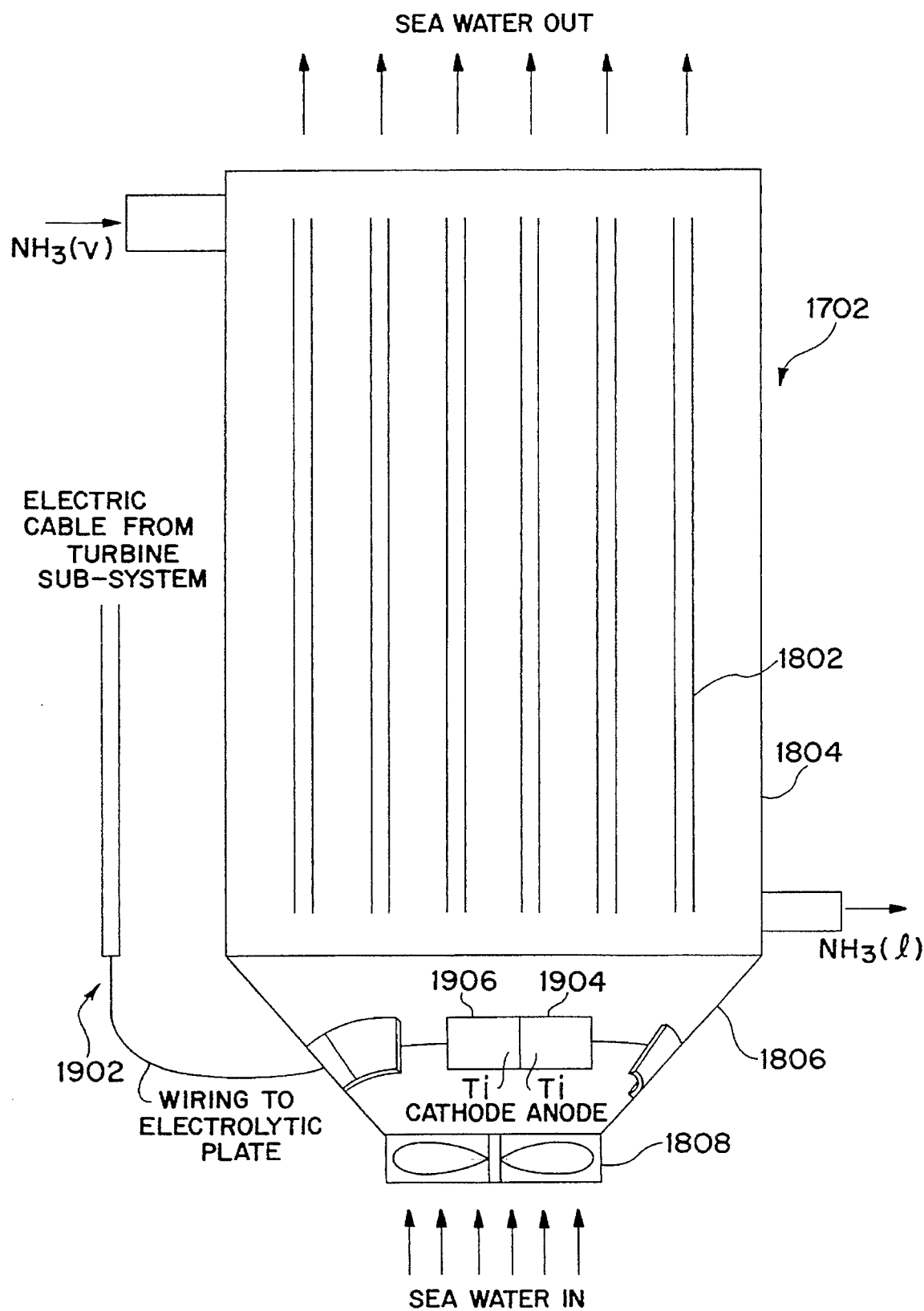

As also discussed above, the second method includes an electrolytic system 1902, illustrated in FIG. 19 with platinized titanium anodes 1904 and titanium cathodes 1906 which deter biofouling by electrolyzing a certain percentage of dissolved salt in the cold sea water to form sodium hypochlorite, which is as effective as molecular chlorine in deterring biofouling. This system may also be employed continuously or intermittently.

The liquid ammonia exits each individual condenser component 1702 and is carried via a network of steel tubes and pipes to a liquid ammonia pump 1704 for each condenser template 1700. The liquid ammonia pumps 1704 include a number of centrifugal pumps acting in parallel or series. Casings protect the centrifugal pump motors situated at the ammonia condenser sub-system 416 depth and connected to the electric generation sub-system 422 by underwater electric cable. The liquid ammonia pumps 1704 pump the liquid ammonia into the liquid ammonia transport 4201 of the ammonia transport sub-system 420 and the closed cycle is completed.

As illustrated in FIG. 10 and discussed above, by locating the ammonia evaporator 418 at a natural depth where the desired warm sea water intake is available and locating the ammonia condenser 416 at a natural depth where the required cold sea water is available alleviates the need for pumping large quantities of warm and cold sea water. Since only the ammonia vapor/liquid is pumped, significant energy is saved.

Figure 20:
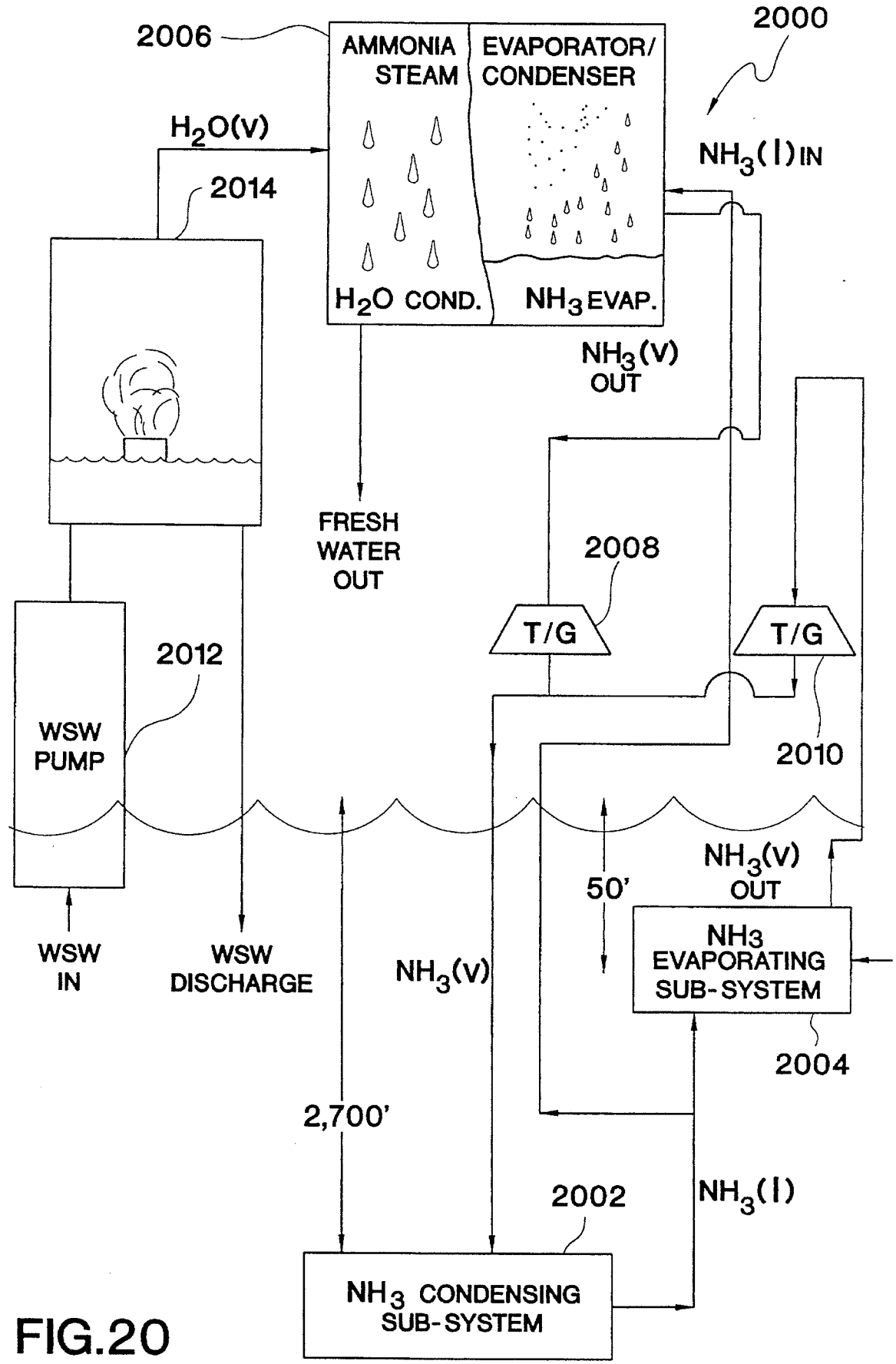
FIG. 20 illustrates another embodiment of the improved OTEC system of the present invention.

FIG. 20 illustrates the improved OTEC system of the present invention, in yet another preferred embodiment. FIG. 20 illustrates a hybrid-cycle OTEC system 2000. The hybrid-cycle OTEC system 2000 includes ammonia condensing sub-system 2002, located approximately 2700 feet below the ocean surface, which condenses and pumps liquid ammonia to ammonia evaporating sub-system 2004, located approximately 50 feet below the ocean surface and to ammonia evaporator/steam condenser 2006, located on a platform above the ocean surface. The ammonia evaporating sub-system 2004 evaporates the liquid ammonia using a flow of warm sea water, available at the 50 foot depth, to produce ammonia vapor. The portion of the ammonia liquid input to ammonia evaporator/steam condenser 2006 is evaporated by water vapor, which will be discussed below. The ammonia vapor output from ammonia evaporator/steam condenser 2006 and the ammonia vapor output from ammonia evaporating sub-system 2004 both are input to separate turbine/generators 2008 and 2010, which generate electricity. The ammonia vapor output from turbine/generator 2008 and turbine/generator 2010 are combined and input to ammonia condensing sub-system 2002 to complete the closed cycle ammonia loop.

Warm sea water pump 2012 pumps warm sea water into flash evaporator 2014, wherein a portion of the warm sea water is evaporated. The remaining warm sea water is returned to the ocean as warm sea water discharge. The water vapor output from flash evaporator 2014 is input to the ammonia evaporator/steam condenser 2006 and thermally contacts the outside of the tubes containing the ammonia liquid from the ammonia condensing sub-system 2002 to produce fresh water and ammonia vapor.

In a preferred embodiment, the ammonia condensing sub-system 2002 and the ammonia evaporating sub-system 2004 each include a shell-and-tube heat exchanger. Sea water flows on the inside of the tubes (the tube side) and the ammonia flows on the outside of the tubes (the shell side) as illustrated in FIGS. 12, 13, 18, and 19.

The improved OTEC system of FIG. 20 is illustrated in more detail in FIGS. 21(*a*) and 21(*b*). The hybrid cycle OTEC system embodiment of FIGS. 21(*a*) and 21(*b*) generates 25.07 megawatts (net) of electricity and 1.36 million gallons of fresh water per day (mgd). The ammonia condensing sub-system 2002 receives 108,700 lbs/min of ammonia vapor at a pressure of 93.1 psia via eight (8) carbon steel pipes with an inner diameter (ID) of 3.5 feet and a length of 6,400 feet. The ammonia condensing sub-system 2002 also receives $1.77 \times 10^7$ lbs/min of cold sea water at a temperature of 43.9° F. from a cold sea water pump (not shown). The ammonia condensing sub-system 2002 has a surface area of 1,527,000 ft$^2$ and a U$_{tot}$ =430 BTU/hour.ft$^2$.°F. The cold sea water exits the ammonia condensing sub-system 2002 at a temperature of 47.5° F. and the liquid ammonia exits at 50° F. and 91.6 psia.

The liquid ammonia is pumped by an ammonia pump 2003 requiring 8.06 megawatts of power, to the ammonia evaporating sub-system 2004. The liquid ammonia, at 50° F. and 825 psia, is transported by one (1) 3.0 foot ID carbon steel pipe which is 6,400 feet in length.

92,200 lbs/min of the liquid ammonia and 1.95×10⁷ lbs/min of warm sea water enter the ammonia evaporating sub-system 2004. The warm sea water enters at 80° F. and exits at 77.6° F. The liquid ammonia exits at 77° F., 136.7 psia, and with an enthalpy of 632.4 BTU/lb. The ammonia evaporating sub-system 2004 has a surface area of 1,343,000 ft² and a $U_{tot}$ of 360 BTU/hour.ft².°F. 0.85 megawatts are required to pump the warm sea water through the ammonia evaporating sub-system 2004. 16,500 lbs/min of the liquid ammonia which exits the ammonia pump is input to ammonia evaporator/steam condenser 2006. This liquid ammonia will be discussed later.

The ammonia vapor output from the ammonia evaporating sub-system 2004 is input to turbine/generator 2010 to generate 31.0 megawatts (gross) of electricity. The liquid vapor exits the turbine/generator 2010 at 50.53° F, 90.3 psia, and with an enthalpy of 613.3 BTU/lb and is returned to the ammonia condensing sub-system 2002 to complete the closed cycle loop.

Figure 21A:
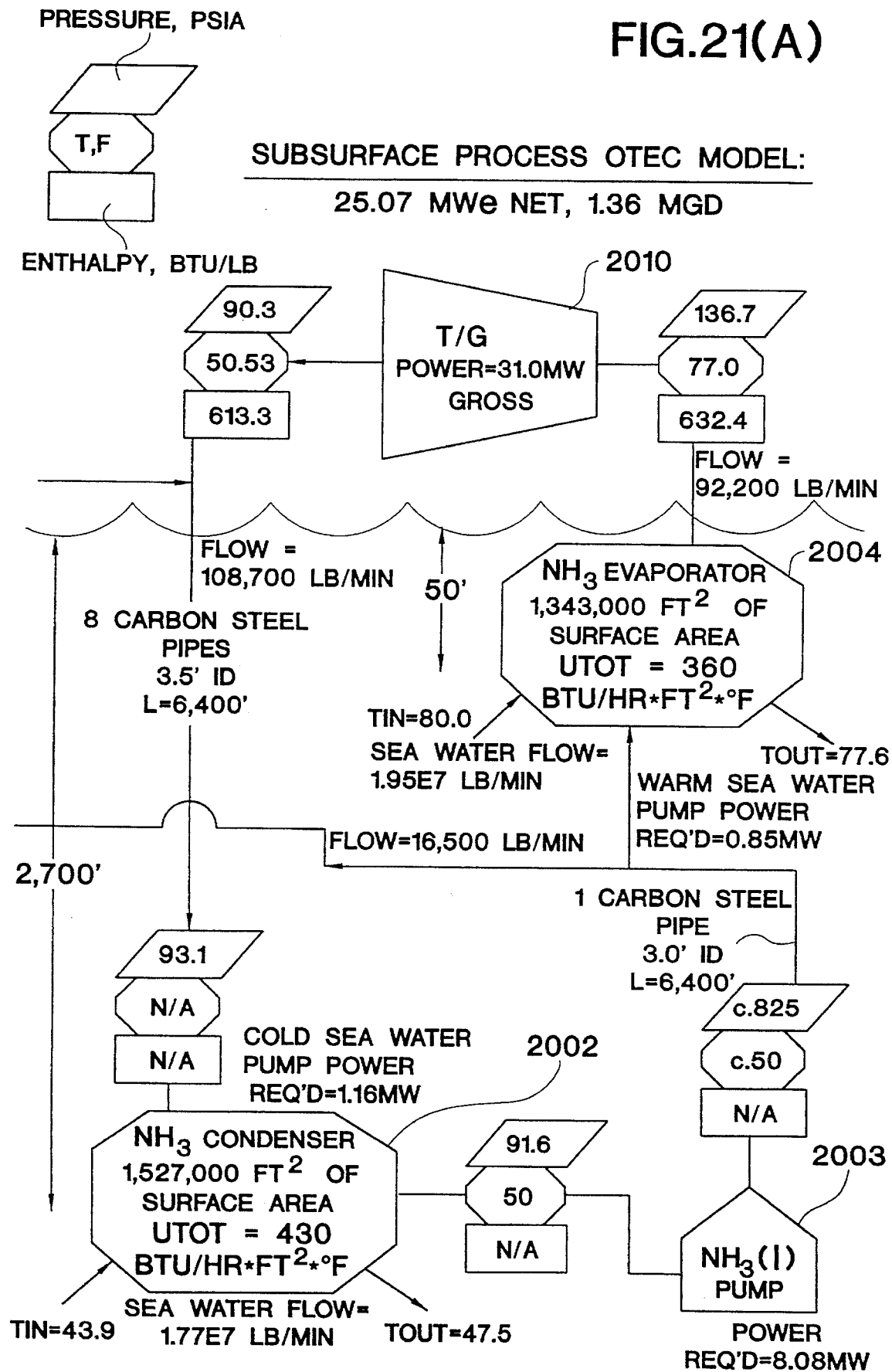
FIGS. 21(a) and 21(b) illustrate the embodiment of FIG. 20 in more detail.
Figure 21B:
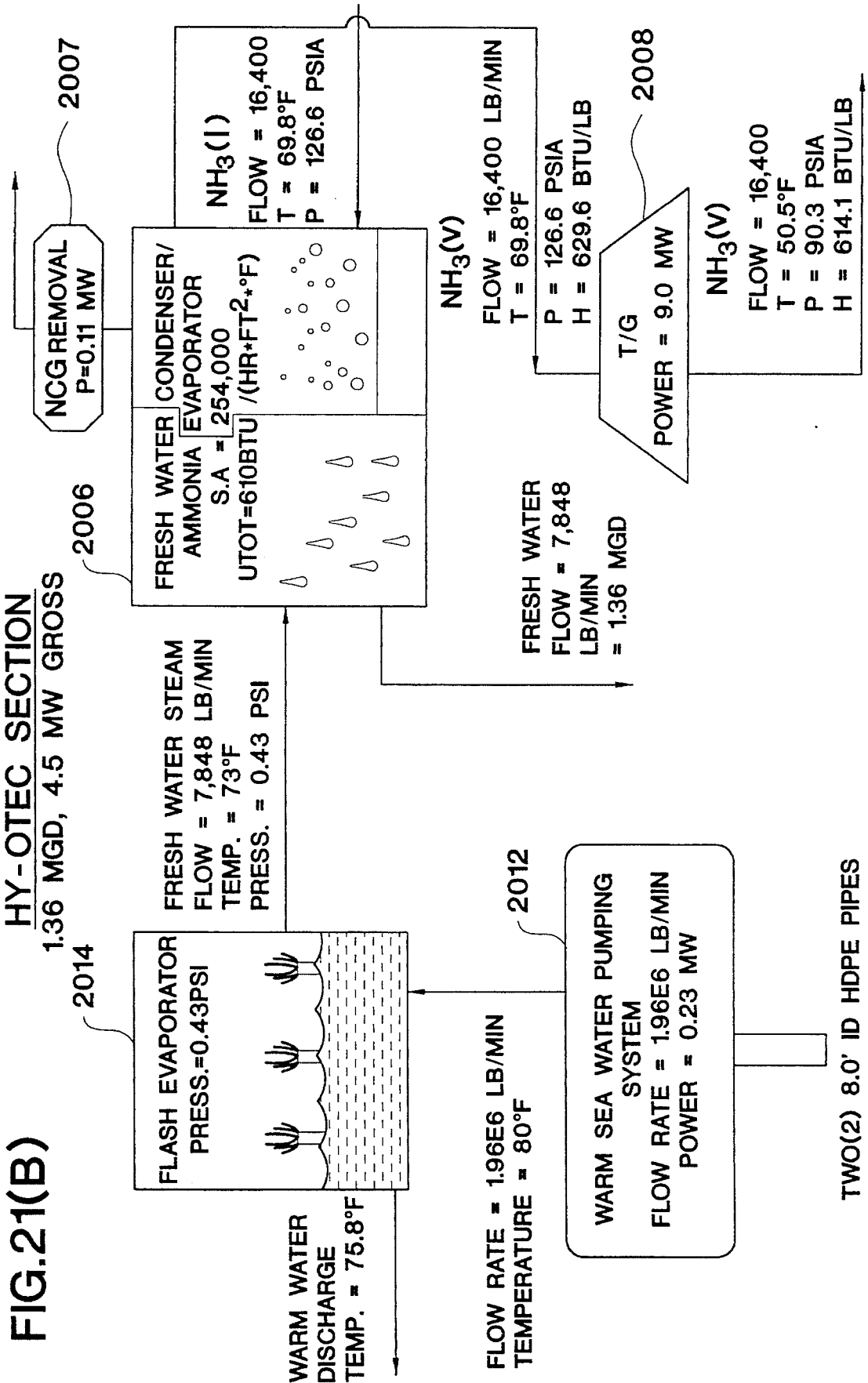

In FIG. 21(b), warm sea water pump 2012 pumps 1.96×10⁶ lbs/min of warm sea water at a temperature of 80° F. to flash evaporator 2014. The warm sea water pump 2012 utilizes 0.23 megawatts of power and is fed by two (2) 8.0 foot ID high density polyethylene (HDPE) pipes. The flash evaporator at a pressure of 0.43 psi produces 7,848 lbs/min of fresh water steam at 73° F. and 0.43 psia and also generates a warm water discharge at 75.8° F. The fresh water steam is input to ammonia evaporator/steam condenser 2006. Further, 16,500 lbs/min of liquid ammonia from the ammonia pump is also input to the ammonia evaporator/ steam condenser 2006 at 69.8° F. and 126.6 psia. The ammonia evaporator/steam condenser 2006 has a surface area of 254,000 ft² and a $U_{tot}$=610 BTU/(hour.ft².°F.) and includes non-condensible gas (NCG) removal system 2007, which utilizes 0.11 megawatts of power. The ammonia evaporator/steam condenser 2006 produces 16,500 lbs/min of ammonia vapor at 69.8° C., 126.6 psia, and with an enthalpy of 629.6 BTU/lb and 7,848 lbs/min of fresh water (1.36 mgd). The ammonia vapor output from the ammonia evaporator/steam condenser 2006 is input to turbine generator 2008 to produce 9.0 megawatts of power. The turbine/ generator 2008 outputs 16,500 lbs/min of liquid ammonia at 50.5° F., 90.3 psia, and with an enthalpy of 614.1 BTU/lb per pound. This liquid ammonia is combined with the liquid ammonia output from turbine/generator 2010 and the combined flow is input to the ammonia condensing sub-system 2002.

In the preferred embodiment, the warm sea water pump 2012, the warm sea water pump (not shown) which pumps warm sea water across the ammonia evaporating sub-system 2004 and the cold sea water pump (not shown) which pumps cold sea water across the ammonia condensing sub-system 2002 are all high flow rate, low head, axial flow, propeller pumps. Also, in a preferred embodiment, the ammonia pump 2003 is a multistage, centrifugal device.

In another preferred embodiment, the non-condensible gas (NCG) removal system 2007 is a low pressure mechanical vapor pump or a low pressure steam injector.

Figure 22:
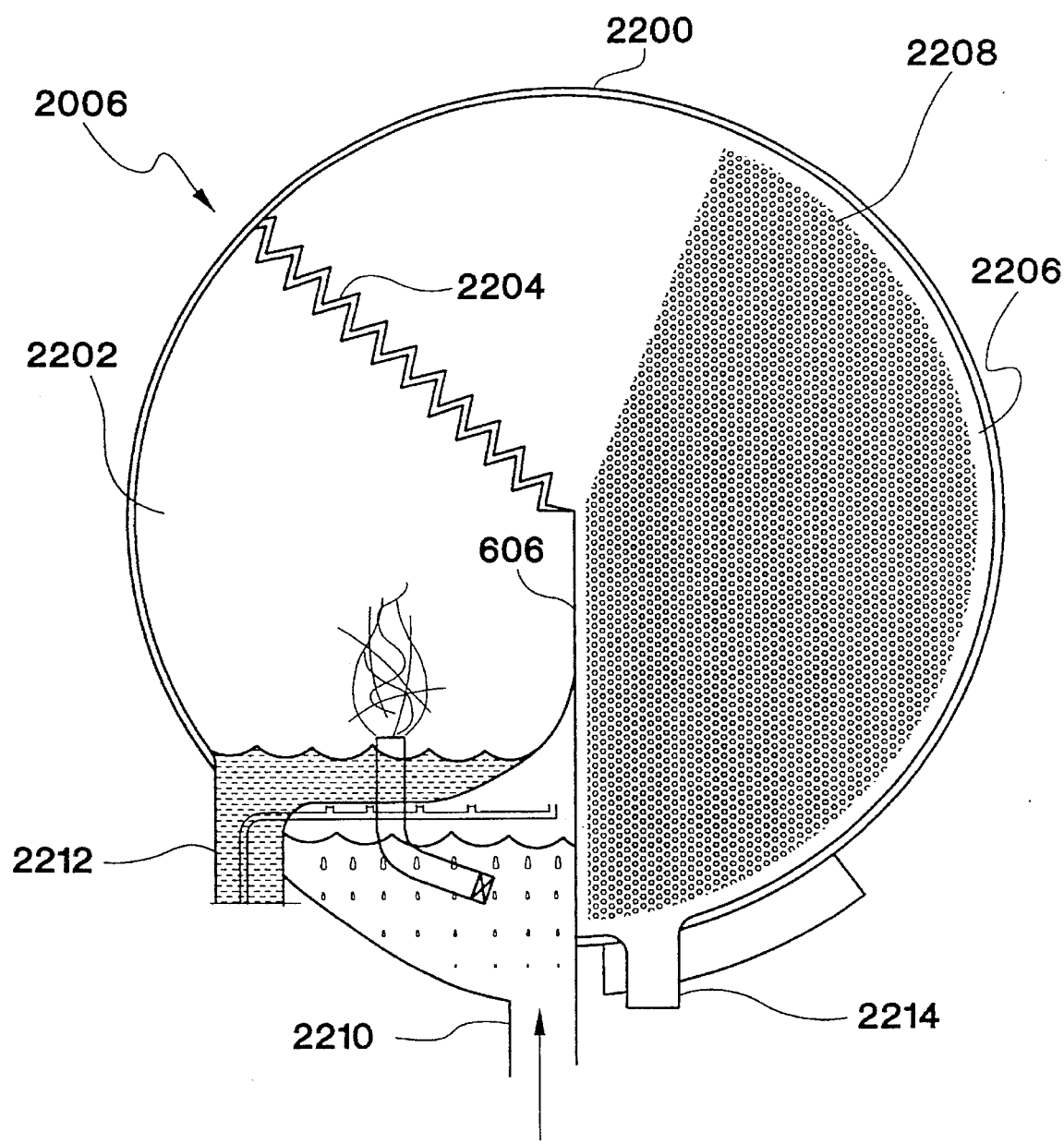
FIG. 22 illustrates the ammonia evaporator/steam condenser of FIG. 20.

The ammonia evaporator/steam condenser 2006 is further illustrated in FIG. 22. The ammonia evaporator/steam condenser 2006 is similar to the evaporator/condenser 404, illustrated in FIG. 6(a). Evaporator/condenser shell 2200 houses a flash evaporation chamber 2202, a mist eliminator 2204, and a fresh water condensing chamber 2206.

In a preferred embodiment, ten (10) ammonia evaporator/ steam condensers 2006 are utilized. Further, each cylinder 2006 has a 6.0 foot inner diameter, wherein a portion larger than half (in FIG. 22, 200° out of 360°) is allocated to the flash evaporation chamber 2202 and a portion less than half (in FIG. 22, 160° out of 360°) is dedicated to the fresh water condensing chamber 2206. The fresh water condensing chamber 2206 includes a number of horizontally aligned tubes 2208. The dimensions of each of the horizontally aligned tubes 2208 and the dimensions of the evaporator/ condenser shell 2200 are set forth below:

| DIMENSIONS | | |
|---|---|---|
| Number of Tubes | = | 2,050 |
| Tube OD | = | 0.50" |
| Tube Wall Thickness | = | 0.025" |
| Tube ID | = | 0.45" |
| Triangular Tube Pitch | = | 2.00 |
| Tube Material | = | SS 316 |
| Tube/Shell Length | = | 12.5' |
| Shell ID | = | 6.00' |
| Shell Wall Thickness | = | 1.8" |
| Shell OD | = | 6.30' |

Each of the ten (10) ammonia evaporator/steam condensers 2006 has five (5) inlet pipes 2210 on the bottom half of the flash evaporation chamber 2202, each pipe having an inner diameter of 1.25 feet.

Each flash evaporation chamber 2202 also requires five (5) discharge pipes 2212, of the same diameter, located about ¼ of the way up the side of the cylinder. The fresh water condensing chamber 2206 has two (2) 1.0 foot inner diameter fresh water discharge pipes 2214 at both ends of the fresh water condensing chamber 2206 and one (1) 2.5 foot inner diameter hole on the side of the fresh water condensing chamber 2206 in order for the non-condensible gases (NCG) to be removed by a non-condensible gas (NCG) removal system 2007. Inlet and exit manifolding for the condenser tube fluid may also be utilized similar to inlet manifold 533 and exit manifold 534, illustrated in FIG. 5(c).

A hybrid cycle OTEC system combines different attributes of the open and closed OTEC systems, allowing the OTEC system to produce both fresh water and electricity. A hybrid design integrates the fresh water and electricity systems, thereby allowing for a reduction in component parts and a greater efficiency.

In a hybrid OTEC system, a working fluid, such as ammonia, is utilized in the closed cycle loop. Ammonia vapor is condensed and the liquified ammonia pressure is raised to approximately 25 psia. The ammonia liquid enters a heat exchanger, where on one side, the ammonia is evaporated and on the other side, fresh water is condensed. The condensed fresh water is pumped for use as potable water and the vaporous ammonia is forced through a turbine to produce electricity. The ammonia is then condensed again and returned to the closed cycle loop.

There are several advantages to a hybrid cycle OTEC system. First, the ammonia evaporator and the fresh steam condenser are the same component, thereby reducing the number of heat exchanges required by one. Further, the heat exchanger also enjoys the advantage of having fluids which do not change in phase on both sides of the heat exchanger. This ensures that the temperature of the fluids will not move toward each other and lower efficiency, as in the case of a conventional heat exchanger. Still further, the ammonia acts as the heat sink for the steam, and as a result, no cold water pipes or pumps are needed. The nature of the closed cycle ammonia loop is such that heat is taken from the surface and deposited in the cold water at the relevant depths.

Figure 23:
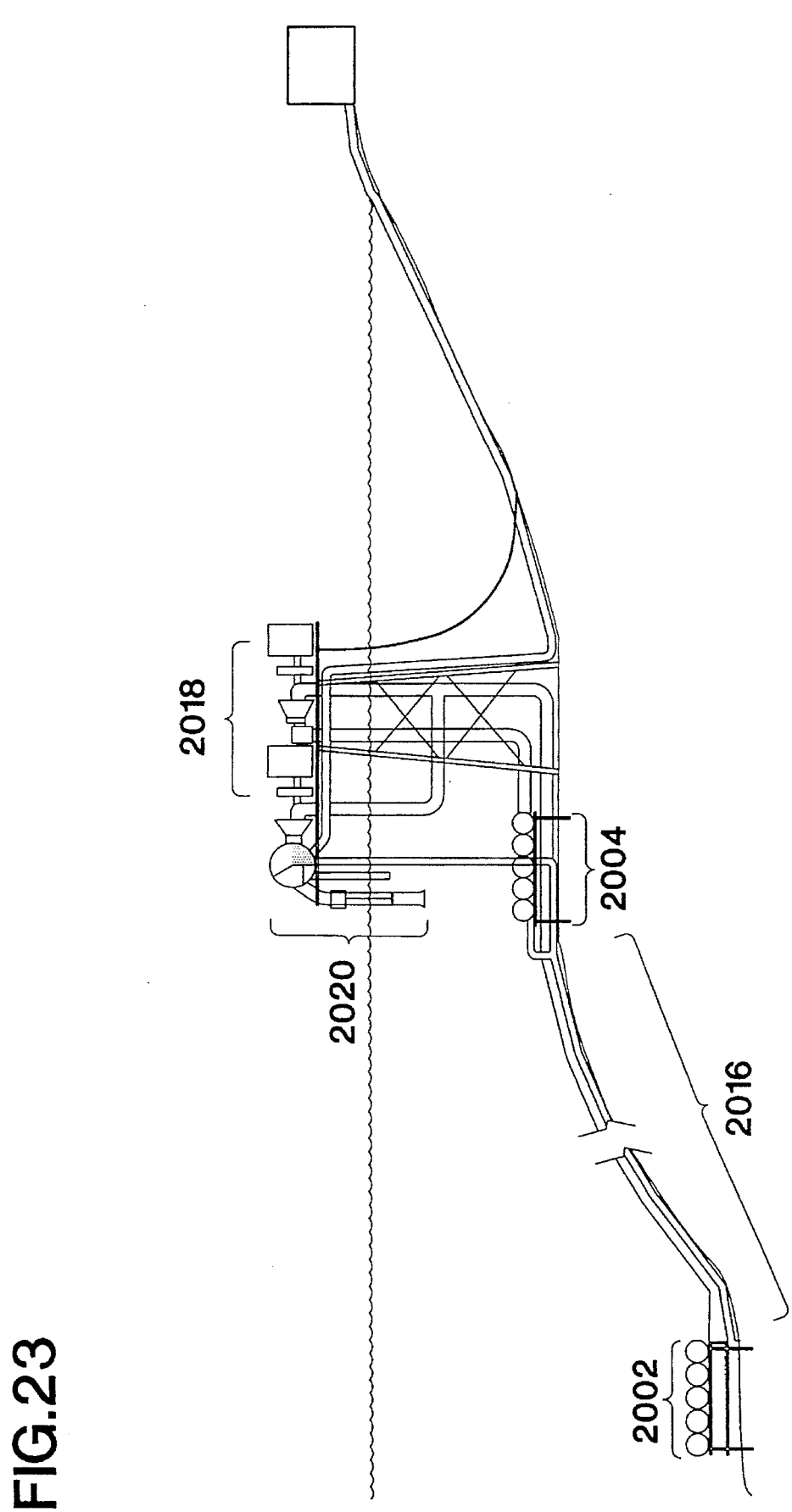
FIG. 23 illustrates the five (5) sub-systems of FIG. 20.

The hybrid cycle OTEC system illustrated in FIG. 20 is further illustrated in FIG. 23. In the embodiment illustrated in FIG. 23, the hybrid cycle OTEC system includes five (5) separate sub-systems: ammonia condensing sub-system 2002, ammonia transport sub-system 2016, ammonia evaporating sub-system 2004, electric generation sub-systems 2018, and hybrid sub-system 2020. The electric generation sub-system 2018 includes the turbine/generators 2008 and 2010 and the hybrid sub-system 2020 includes the ammonia evaporator/system condenser 2006.

Figure 24:
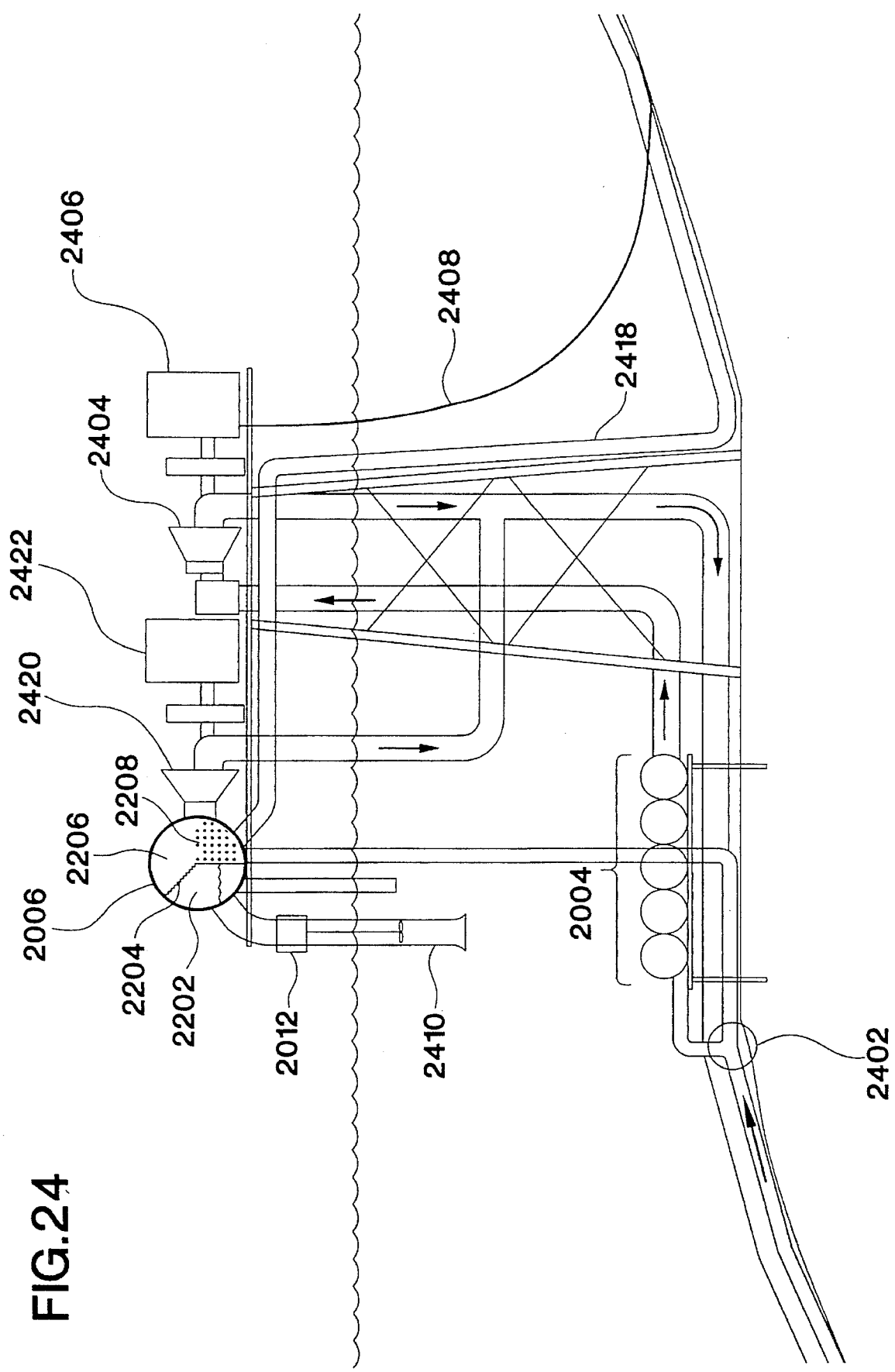
FIG. 24 illustrates the ammonia evaporating sub-system, the electric generation sub-system, and the hybrid sub-system of FIGS. 23 in more detail.

FIG. 24 illustrates the ammonia evaporating sub-system 2004, the electric generation sub-system 2018, and the hybrid sub-system 2020 in more detail. The ammonia transport sub-system 2016 transports liquid ammonia from the ammonia condensing subsystem 2002. A pipeline split 2402 directs a certain percentage of a liquid ammonia to the ammonia evaporating sub-system 2004 and a certain percentage of a liquid ammonia to the ammonia evaporator/steam condenser 2006. The turbine/generator 2010 includes expander-turbine 2404 which reduces the ammonia vapor to a state of lower pressure, temperature, and enthalpy, and transfers the extracted power to a generator 2406 which converts the extracted power to useful electrical output. Electricity is carried to an on-shore interconnection point with local utilizes via a submersible power line 2408.

The liquid ammonia which bypasses the ammonia evaporating sub-system 2004 enters the hybrid sub-system 2020, which includes a warm surface sea water inlet pipe 2410 and the warm sea water pump 2012 for the introduction of warm surface sea water into the flash evaporation chamber 2202. A certain percentage of the sea water flash evaporates and the remainder falls to the floor of the flash evaporation chamber 2202, where it is discharged back into the ocean. The vaporized sea water passes through the mist eliminator 2204, inside the ammonia evaporator/steam condenser 2006 to remove entrained sea water droplets. The vapor then enters the fresh water condensing chamber 2206, where it passes across a bank of condensing tubes 2208. The vapor liquifies from contact with these tubes and falls to the floor of the fresh water condensing chamber 2206 to be carried to an on-shore utility interconnection site via a fresh water pipeline 2418.

The liquid ammonia which enters the hybrid sub-system 2020 passes through the inside of the condensing tubes 2208 where it evaporates. The vaporized ammonia passes from the ammonia evaporator/steam condenser 2006 to turbine/generator 2008, which includes an expander-turbine 2420 and a generator 2422. In the same manner described above with respect to expander-turbine 2404 and generator 2406, the expander-turbine 2420 and the generator 422 are used to produce electricity. The turbine/generators 2008 and 2010 and in parallel and no mixture of the ammonia vapor occurs until final passage to the expander-turbines and directly prior to introduction to the ammonia transport sub-system 2016.

As illustrated in FIG. 21(a), ammonia condenser 2002 and ammonia pump 2003 are located 2700 feet below the ocean surface. In another preferred embodiment, illustrated in FIG. 25, both the ammonia condenser 2002 and the ammonia evaporator 2004 are located below the wave action of the ocean surface. In a preferred embodiment, this depth is 50 to 100 feet below the ocean surface. In yet another preferred embodiment, this depth is 100 feet.

Moving the ammonia condenser 2002 necessitates the inclusion of cold sea water piping to bring cold sea water from its naturally occurring depth of 2,700 feet to the new depth of the ammonia condenser 2002, namely about 100 feet. In this embodiment, the ammonia transport sub-system 2016 is not required, since the ammonia liquid and vapor are no longer carried to the deeper depth.

One important aspect of this embodiment is the placement of the cold sea water pump 2502. Conventional OTEC designs have placed these cold sea water pumps at the surface end of the pipeline where they "pull" the cold sea water to the surface. This technique creates a net external pressure on the pipeline and also creates a tendency for the pipeline to buckle. To resist this buckling, in conventional OTEC designs, a pipe having a large pipewall thickness has been used, which increases the cost of the piping.

Figure 25:
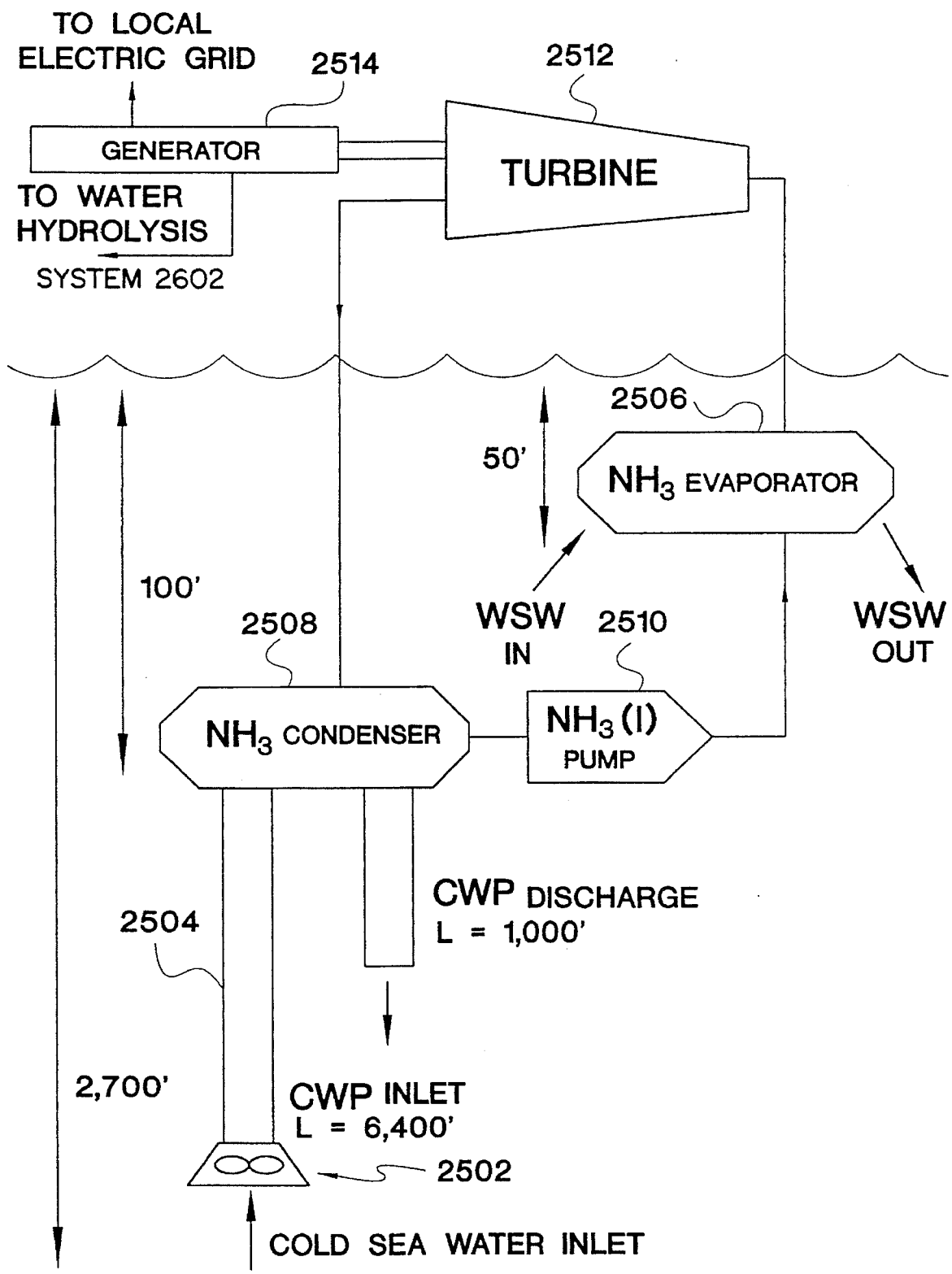
FIG. 25 illustrates another embodiment of the improved OTEC system of the present invention.

In contrast, in the embodiment illustrated in FIG. 25, the cold sea water is "pushed" into the pipe 2504, in order to create a net internal pressure. As a result, the pipe material must only resist the hoop stress, which, under typical OTEC conditions, requires a considerably thinner pipe. The pipe 2504 may therefore be made of a flexible material, preferably, a reinforced fabric.

For example, consider the use of high density polyethylene (HDPE) in OTEC applications. For a 10 foot diameter pipe, 5 psi external pressure requires a wall thickness of 4.77 inches, while 5 psi of internal pressure requires a wall thickness of only 0.47 inches. The above-identified example holds true, regardless of the material utilized for the pipe 2504.

When the cold sea water is "pushed" into the pipe 2504, a considerably thinner, less expensive, and flexible pipe 2504 may be utilized. A less expensive pipe 2504 makes it economically feasible to pump cold sea water from a depth of approximately 2700 feet to the surface, for a variety of applications. These applications include air conditioning and ice-making, wherein the cold water is pumped to the surface, utilized to freeze a working fluid such as freon, and then utilized to cool forced air in an air conditioning system or to freeze water to form ice. Alternatively, the cold sea water may be run directly through pipes surrounding the rooms of a building in order to provide air conditioning. In another application, the cold sea water, pumped to the surface, may be supplied under soil utilized to grow fruits and vegetables, in order to provide the fruits and vegetables with numerous nutrients to enhance their growth. In another application, the cold sea water pumped from approximately 2700 feet is dumped in a tank, where the cold sea water reacts with sunlight in order to produce kelp. The kelp may be then utilized to feed fish for mariculture. Further, the cold sea water may be utilized to cool the tank housing the fish, using the "air conditioning" principles discussed above. The ammonia evaporator 2506 and ammonia condenser 2508 illustrated in FIG. 25 are similar in design to the shell-and-tube heat exchangers disclosed above with respect to FIG. 20, wherein ammonia is on the shell side and sea water is on the tube side. In a preferred embodiment, the ammonia evaporator 2506 and ammonia condenser 2508 have the following parameters:

| Ammonia Condenser | |
| --- | --- |
| Number of Units | 800 |
| Number of Tubes/Unit | 4,500 |
| Tube OD | 0.75" |
| Tube Wall Thickness | 0.050" |
| Tube ID | 0.65" |
| Tube Material | Aluminum Alloy |
| Tube Length | 18.0' |
| Tube Pitch | 1.25 |

-continued

| | |
|---|---|
| Shell ID | 5.82' |
| Shell Wall Thickness | 1.0" |
| Shell OD | 6.0" |
| Shell Cylinder Material | Carbon Steel |
| Tube Sheet Material | Aluminum Alloy |
| Cone Material | Aluminum Alloy |
| Heat Exchanger Weight | 15 tons (Approx.) |

| Ammonia Evaporator | |
|---|---|
| Number of Units | 625 |
| Number of Tubes/Unit | 4,500 |
| Tube OD | 0.75" |
| Tube Wall Thickness | 0.050" |
| Tube ID | 0.65" |
| Tube Material | Aluminum Alloy |
| Tube Length | 18.0' |
| Tube Pitch | 1.25 |
| Shell ID | 5.82' |
| Shell Wall Thickness | 1.0" |
| Shell OD | 6.0" |
| Shell Cylinder Material | Carbon Steel |
| Tube Sheet Material | Aluminum Alloy |
| Cone Material | Aluminum Alloy |
| Heat Exchanger Weight | 15 tons (Approx.) |

The liquid ammonia pump 2510 required in this embodiment may be located below the wave action, at the same depth as the ammonia condenser 2508 or the ammonia evaporator 2506 or on a platform above the surface. In this embodiment, only the cold sea water pump 2502 for pumping the cold sea water is located at the deeper depth of 2700 feet and the cold sea water pumped by the cold sea water pump 2502 is transported to the ammonia condenser 2508 by the thin walled pipe 2504, illustrated in FIG. 25.

The power demand of a typical community does not remain constant, rather, the power demand fluctuates over the course of a day. The minimum level of power demand (occurring usually very late at night or in the predawn morning hours) is referred to as the base load power demand and other periods of increased power demand (the start of the work day or at dinner time) are called the peak load power demand.

Independent power producers (IPPs) build, finance, and operate power generation plants and sell their electricity to the local utility for distribution. IPPs get more per unit of electricity (kWh) during the peak load times than during the base load times, as a result of simple supply and demand principles.

From an economic perspective, it would appear to be desirable to sell as much power as possible during the peak load hours. However, if a plant concentrates primarily on producing large amounts of power to meet the peak load, the plant will likely have to run a greatly reduced capacity at other non-peak times when the demand is less and the utility can not buy all of the electricity produced.

Whether to target peak or base load power demand (or more realistically, what combination of both) is a crucial decision for energy planners. Since OTEC is a renewable energy, the fuel is free, compared to an oil or coal plant, and all the costs are upfront capital costs. This means that the plant costs the same whether it is being run or not. The cost of having an idle OTEC plant or an OTEC plant at reduced capacity during base load hours is far greater than for a fossil fuel plant.

One way to avoid this financial loss is by "storing" the unsold electricity produced during the base load hours and by selling it at a higher rate during peak load hours. However, it is extremely difficult to "store" electricity. Hydrolysis of sea water is one of the most attractive methods of storing electricity for an OTEC application.

Figure 26:
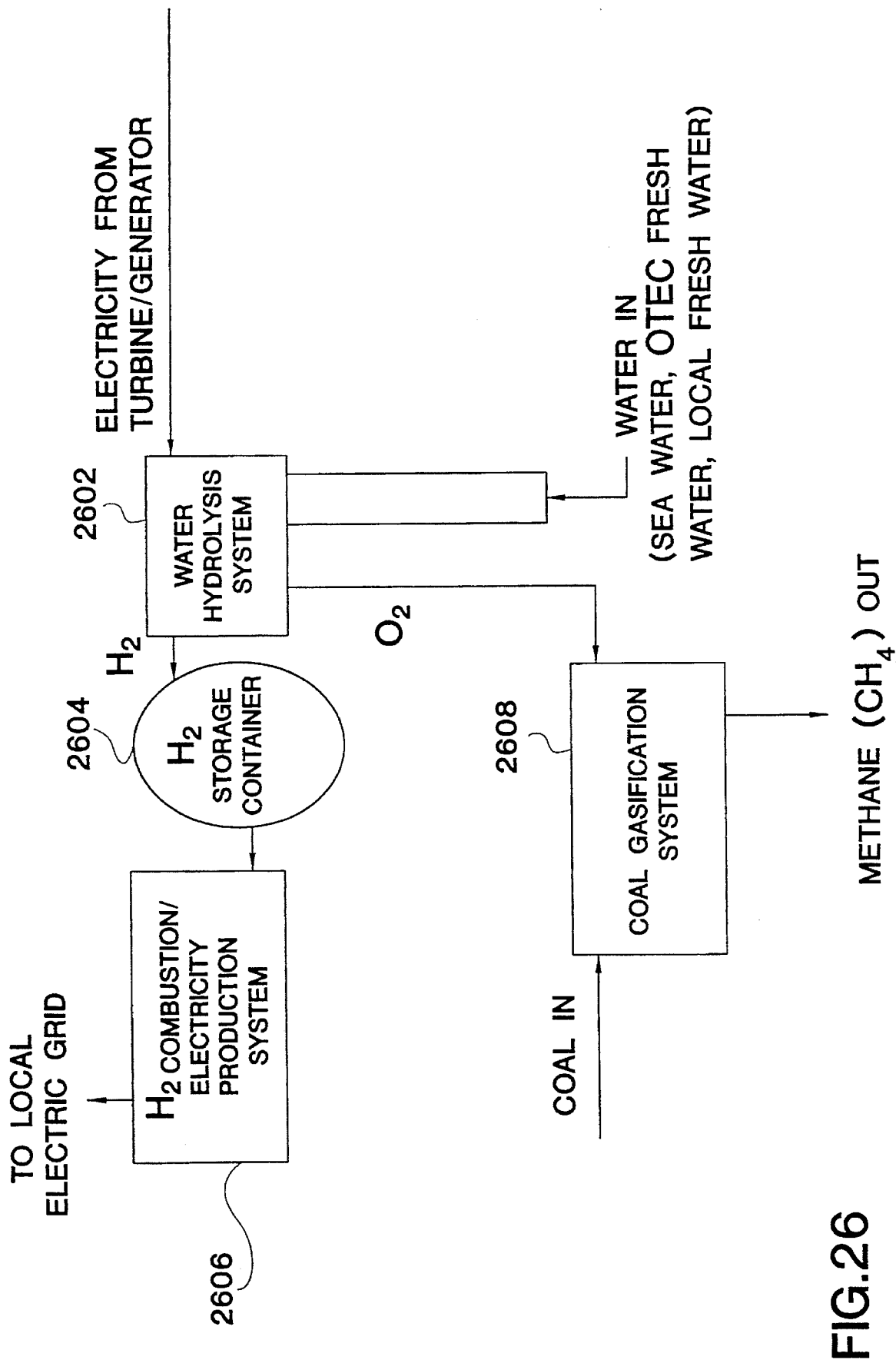
FIG. 26 illustrates a water hydrolysis system, hydrogen gas combustion system, and coal gasification system used in combination with the embodiment illustrated in FIG. 25.

As illustrated in FIG. 25, the ammonia evaporator 2506 produces ammonia vapor which is input to turbine 2512 and generator 2514 to produce electricity, which is supplied to a local electric grid or to a water hydrolysis system 2602, illustrated in FIG. 26. The water hydrolysis system 2602 receives water (either OTEC generated fresh water, local fresh water, or sea water) and applies an electric current to the water to break the bonds between the hydrogen and oxygen molecules to produce $H_2$ gas and $O_2$ gas. The $H_2$ gas is stored in $H_2$ storage container 2604 and utilized in $H_2$ combustion/electricity production system 2606 to generate electricity, supplied to the local electric grid. The $O_2$ gas is input to coal gasification system 2608 which also receives coal in order to produce methane gas, by conventional techniques.

Hydrogen is an excellent fuel; it may be burned very easily in a number of configurations to produce electricity. Pure hydrogen (such as the hydrogen generated from an OTEC application) leaves no emissions other than water vapor. It is difficult to transport pure hydrogen, however, this problem may be avoided by placing the hydrogen burning equipment on site with the OTEC system.

For example, if the OTEC system of FIG. 25 could sell 100 megawatts of electricity 12 hours per day (peak load) and 50 megawatts of electricity 12 hours a day (base load), if the OTEC system of FIG. 25 was designed such that full capacity was 75 megawatts of electricity, then the OTEC system of FIG. 25 could be run at capacity constantly, but during the base loads, only 50 megawatts would be sold to the utility and the additional 25 megawatts would be kept for the hydrolysis of water. During peak load periods, all 75 megawatts from the OTEC plant would be sold to the utility, in addition to the 25 megawatts resulting from the hydrogen burning, in order to provide the utility with a total of 100 megawatts during the peak loads.

The other by-product of water hydrolysis, namely oxygen, also has numerous uses. Certain industrial processes requires abundant supplies of oxygen. Once such example is coal gasification, a process by which coal is treated to produce clean methane gas. This substantially mitigates the environmental harmful effects of burning coal by using a reliable, inexpensive source of pure oxygen.

By employing water hydrolysis in an OTEC plant, the plant may always be run at full capacity, and large amounts of power may be "stored" in order to be applied during peak loads.

The invention being thus described, it will be obvious that the same may be varied in many ways. Such variations are not to be regarded as a departure from the spirit and scope of the invention and all such modifications which would be obvious to one of ordinary skill in the art are intended to be included within the scope of the following claims.

What is claimed is:

1. A hybrid ocean thermal energy conversion (OTEC) system, comprising:

energy generation means including evaporating means, located below a wave action of an ocean for receiving warm sea water from the ocean, evaporating a working fluid at a natural depth of the received warm sea water from the ocean to produce a working vapor, turbine means, located above a surface of the ocean, for generating energy from the working vapor, condensing means, located below the wave action of the ocean, for condensing the working vapor with only cold sea water from the ocean to recycle the working fluid; and pushing means, including a pump, for pushing the only cold sea water from the ocean up to said condensing means; said pump being located at a natural depth of the only cold sea water from the ocean.

2. A hybrid ocean thermal energy conversion (OTEC) system, comprising:

energy generation means for receiving warm sea water, evaporating a working fluid with the received warm sea water to produce a working vapor, and generating energy from the working vapor;

water hydrolysis means, driven by the energy generated by said energy generation means, for hydrolyzing a source of water into hydrogen gas and oxygen gas;

hydrogen combustion means for receiving the hydrogen gas and for producing electricity; and coal gasification means for receiving the oxygen gas and for gasifying coal to produce methane.

3. The hybrid ocean thermal energy conversion (OTEC) system of claim 1, wherein the wave action of the ocean is 50 to 100 feet below the surface of the ocean.

4. The hybrid ocean thermal energy conversion (OTEC) system of claim 3, wherein the wave action of the ocean is 100 feet below the surface of the ocean.

\* \* \* \* \*